(12) United States Patent
Ushino et al.

(10) Patent No.: US 7,618,715 B2
(45) Date of Patent: Nov. 17, 2009

(54) WAVELENGTH PLATE

(75) Inventors: Takuhiro Ushino, Tokyo (JP); Tatsuya Hirono, Tokyo (JP); Masayuki Sekiguchi, Tokyo (JP)

(73) Assignee: JSR Corporation, Tokyo (JP)

( * ) Notice: Subject to any disclaimer, the term of this patent is extended or adjusted under 35 U.S.C. 154(b) by 146 days.

(21) Appl. No.: 10/581,201

(22) PCT Filed: Nov. 30, 2004

(86) PCT No.: PCT/JP2004/017800

§ 371 (c)(1),
(2), (4) Date: Jun. 1, 2006

(87) PCT Pub. No.: WO2005/054912

PCT Pub. Date: Jun. 16, 2005

(65) Prior Publication Data

US 2007/0127130 A1    Jun. 7, 2007

(30) Foreign Application Priority Data

Dec. 1, 2003  (JP) .............. 2003-401690
Dec. 22, 2003 (JP) .............. 2003-425369

(51) Int. Cl.
*B32B 27/08* (2006.01)
(52) U.S. Cl. .................................. 428/515
(58) Field of Classification Search ............ None
See application file for complete search history.

(56) References Cited

U.S. PATENT DOCUMENTS

| | | | |
|---|---|---|---|
| 6,295,109 B1 * | 9/2001 | Kubo et al. ............ | 349/119 |
| 6,580,674 B1 | 6/2003 | Nishiyama et al. | |
| 6,912,029 B2 * | 6/2005 | Tanaka .................. | 349/118 |
| 2007/0003775 A1 * | 1/2007 | Ushino et al. .......... | 428/500 |

FOREIGN PATENT DOCUMENTS

| | | |
|---|---|---|
| CN | 2051747 U | 1/1990 |
| CN | 1413304 A | 4/2003 |
| JP | 1 132626 | 5/1989 |
| JP | 2001-101700 | 4/2001 |
| JP | 2001-159744 | 6/2001 |
| JP | 2001 208913 | 8/2001 |
| JP | 2001-272542 | 10/2001 |
| JP | 2001-311821 | 11/2001 |
| JP | 2002 14228 | 1/2002 |
| JP | 2002-341290 | 11/2002 |
| JP | 2003-270435 | 9/2003 |
| JP | 2003-329834 | 11/2003 |

OTHER PUBLICATIONS

U.S. Appl. No. 10/581,523, filed Jun. 2, 2006, Sekiguchi, et al.
U.S. Appl. No. 10/581,524, filed Jun. 2, 2006, Hirono, et al.
Inoue et al., "Dynamic Birefringence of Amorphous Polyolefins II. Measurements on Polymers Containing Five-Membered Ring in Main Chain", Polymer Journal, vol. 27, No. 9, pp. 943-950, 1995.
Inoue et al., "An Apparatus for Dynamic Birefringence Measurements", Journal of Japan Rheological Society, vol. 19, No. 2, pp. 93-97, 1991 (with English abstract).

* cited by examiner

*Primary Examiner*—Sheeba Ahmed
(74) *Attorney, Agent, or Firm*—Oblon, Spivak, McClelland, Maier & Neustadt, L.L.P.

(57) ABSTRACT

The present invention is intended to provide wave plates which have excellent initial properties, are hardly influenced by the usage environment or the production environment and have excellent long-term reliability. The first wave plate of the invention is a wave plate comprising two or more retardation films, wherein the retardation films are not bonded to each other in the laser beam transmission area and further they are bonded to each other in at least a part of other area than the laser beam transmission area. The second wave plate is a wave plate comprising at least two retardation films which are laminated on each other, on at least one surface of said laminated retardation films a glass substrate being laminated, wherein the retardation films, and the retardation film and the glass substrate are lamination-fixed respectively with different adhesives which are selected from an adhesive (A) having a glass transition temperature of not higher than 0° C. and a Young's modulus at 23° C. of not more than 10 MPa and an adhesive (B) having a glass transition temperature of not lower than 40° C. and a Young's modulus at 23° C. of not less than 30 MPa (with the proviso that a difference in glass transition temperature between the adhesive (A) and the adhesive (B) is 60° C. or more and a difference in Young's modulus at 23° C. between the adhesive (A) and the adhesive (B) is 40 Mpa or more).

10 Claims, 2 Drawing Sheets

(a)　　　　　　　　　　　　(b)

View observed from the top　　View observed from the side

1: Retardation film A-1

2: Retardation film A-2

3: Adhesive layer (overlap width)

4: Non-adhesive area (area devoid of overlap width)

5: Area where adhesive is absent (a) View observed from the top (b) View observed from the side 1: Retardation film B 2: Retardation film B 3: Adhesive layer (overlap width)

4: Non-adhesive area (area devoid of overlap width)

5: Area where adhesive is absent but substrate is present

6: Substrate

7: Area where neither adhesive nor substrate is present (laser beam transmission area)

WAVELENGTH PLATE

TECHNICAL FIELD

The present invention relates to wave plates used for laser optical system, and more particularly to wave plates using at least two transparent resin films (referred to "retardation films" hereinafter) having a function of giving a phase difference to a transmitted light.

BACKGROUND ART

Optical disc devices are optical information recording/reproducing devices uses of which have been greatly increased by reasons of non-contact type, a large quantity of information per unit volume, high-speed access, low cost, etc., and making the best use of these features, various recoding media have been developed. For example, there have been developed compact disc (CD), laser disc (registered trade mark, LD), CD-ROM, DVD-ROM and the like for reproducing previously recorded information as sounds, images or computer programs, CD-R, DVD-R and the like which are capable of writing information thereon with laser only once and reproducing the information, and magneto-optical disc (MO), DVD-RAM, DVD-RW and the like which are capable of repeatedly recording/reproducing information.

As optical system devices for carrying out recording and/or reproduction of information by the above optical information recording/reproducing media, various devices are known, and as one of them, a rewritable magneto-optical disc device is widely known. For example, a rewritable magneto-optical disc device having a light pickup device in which a ½λ wave plate (also referred to as a "½ wave plate" hereinafter) is arranged midway an optical path where a light emitted from a laser beam source passes through a polarizer and a polarized beam splitter (PBS), reaches a magneto-optical disc and reflected by the magneto-optical disc and the reflected light passes through the PBS again and reaches a photodetector, or a rewritable magneto-optical disc device having a light pickup device in which a ¼λ wave plate (also referred to as a "¼ wave plate" hereinafter) is arranged is known.

The "½ wave plate" used herein is a wave plate that gives an optical path difference of λ/2 (therefore, a phase difference of π) between two polarized light components of specific wavelengths intersecting at right angles, and the "¼ wave plate" used herein is a wave plate that gives an optical path difference of λ/4 (therefore, a phase difference of π/2) between two polarized light components of specific wavelengths intersecting at right angles.

A wave plate used in a liquid crystal projector is, for example, a wave plate functioning as a polarization transfer device and having a function of separating an incident natural light into a P polarized light and a S polarized light whose planes of polarization intersect at right angles and rotating one of the planes of polarization of the thus separated P polarized light and S polarized light substantially by 90° to coincide the angle of the plane of polarization of the polarized light with the plane of the polarization of the other polarized light. According to such a polarization transfer device, most of the polarized lights obtained are made to have a substantially single plane of polarization, so that high utilization efficiency of light can be obtained in the liquid crystal projector. In the polarization transfer device, a ½ wave plate is used as a means to rotate the plane of polarization of the incident polarized light substantially by 90°. In case of the liquid crystal projector, after a light is dispersed into three primary colors of light (RGB) by a dichroic mirror, they are transmitted by the corresponding liquid crystal panels, respectively, then synthesized by a cross prism and released from a projection lens. For the purpose of enhancing luminance, a ¼ wave plate is sometimes placed between the liquid crystal panel and the cross prism, and in this case, a ¼ wave plate making ¼ wavelength not only at the specific wavelengths but also in a wide band is sometimes desired because the wavelength of the dispersed light has a certain width.

As the wave plates applied to such uses, those of inorganic type, such as a wave plate formed from single crystals having birefringence property such as mica, quartz, quartz crystal, calcite, $LiNbO_3$ and $LiTaO_3$, a wave plate having a birefringence film on a surface of a base substrate such as a glass substrate, said film being obtained by depositing an inorganic material obliquely against the base substrate, and a wave plate having a LB (Langmuir-Blodget) film of birefringence property, have been heretofore employed.

Further, there has been employed a wave plate wherein a retardation film, which is an organic substance thin film imparted with birefringence property (function of giving phase difference to a transmitted light) by stretch-orientating a film of a transparent resin, such as polycarbonate (PC), triacetyl acetate (TAC), polyvinyl alcohol (PVA), polyvinyl butyral (PVB), polyethylene terephthalate (PET), polypropylene (PP), polyallylate, polysulfone, polyether sulfone or acrylic resin, is bonded to a glass substrate or sandwiched between two glass substrates for the purpose of maintaining flatness or fixed shape. Furthermore, there has been also employed a wave plate imparted with birefringence property, in which a high-molecular weight liquid crystal film is formed on a glass substrate or sandwiched between two glass substrates for the purposes maintaining flatness or fixed shape and carrying out molecular orientation.

Recently, as a high-density information recording medium, DVD is rapidly spreading, and on the other hand, optical discs of reproduction only type or rewritable type, such as CD, CD-ROM and CD-R, have already spread widely in the market. For the optical disc devices, therefore, not only an ability of recording information on these various optical discs of different systems but also an ability of reproducing information from them is required. Moreover, with widening of the applicable field, miniaturization and cost lowering are also required. In order to satisfy these requirements, use of wideband wave plates (retardation plates) applicable to plural lasers for reading and writing has been proposed (patent documents 1 to 3). Of these documents, the patent document 3 (Japanese Patent Laid-Open Publication No. 14228/2002) proposes a wave plate having properties that after two kinds of incident linear polarized lights whose planes of polarization are parallel with each other pass through the wave plate, the planes of polarization of two kinds of outgoing linear polarized lights are made to intersect at right angles. In such a wave plate, two or more retardation films are used in order to obtain desired optical properties, so that not only the retardation film is bonded and fixed to a glass substrate but also the retardation films are bonded and fixed to each other. In case of the wave plate having a constitution that the retardation films are bonded to each other, however, there resides a problem that in-plane aberration is changed by long-term continuous use and excellent properties initially obtained cannot be retained. In addition, there has been pointed out a problem that properties of the retardation films are reflected as properties of the wave plate, so that a phase difference value (retardation) of the wave plate is gradually changed by long-term continuous use depending upon the usage environment, or in-plane aberration is made large by non-uniform thickness of the film, and as a result, excellent properties initially obtained cannot be retained occasionally.

In order to inhibit the above problems, it can be thought that the retardation films are independently incorporated into a laser optical system without bonding them. In this case, however, other problems take place. For example, it becomes essential to precisely control optical axes of the retardation films before they are incorporated, and as a result, much labor is required in the production of equipment. Moreover, deviation occurs in the relation between the optical axes of the retardation films because of vibration or the like given when the wave plate is used, and as a result, properties of the wave plate are lowered.

Patent document 1: Japanese Patent Laid-Open Publication No. 101700/2001

Patent document 2: Japanese Patent Laid-Open Publication No. 208913/2001

Patent document 3: Japanese Patent Laid-Open Publication No. 14228/2002

DISCLOSURE OF THE INVENTION

Problems to be Solved the Invention

The present invention has been made in view of the prior art as mentioned above, and it is an object of the present invention to provide wave plates for optical information recording/reproducing devices and liquid crystal projectors, said wave plates having excellent initial properties, being hardly influenced by the usage environment and the production environment and having excellent long-term reliability.

Means to Solve Problems

In order to solve such problems associated with the prior art as described above, the present inventors have earnestly studied, and as a result, they have found that a wave plate (referred to as a "first wave plate" hereinafter) comprising two or more retardation films, wherein the retardation films are not bonded to each other in the laser beam transmission area and further the retardation films are bonded to each other in at least a part of other area than the laser beam transmission area is preferable as a wave plate for optical information recording/reproducing devices and liquid crystal projectors, said wave plate having excellent initial properties, being hardly influenced by the usage environment and the production environment and having excellent long-term reliability.

The present inventors have also found that a wave plate (referred to as a "second wave plate" hereinafter) comprising at least two retardation films which are laminated on each other, on at least one surface of said laminated retardation films a glass substrate being laminated, wherein the retardation films, and the retardation film and the glass substrate are lamination-fixed respectively with different adhesives which are selected from the following adhesives (A) and (B) is preferable as a wave plate for optical information recording/reproducing devices and liquid crystal projectors, said wave plate having excellent initial properties, being hardly influenced by the usage environment and the production environment and having excellent long-term reliability;

an adhesive (A): an adhesive having a glass transition temperature of not higher than 0° C. and a Young's modulus at 23° C. of not more than 10 MPa, and an adhesive (B): an adhesive having a glass transition temperature of not lower than 40° C. and a Young's modulus at 23° C. of not less than 30 MPa, with the proviso that a difference in glass transition temperature between the adhesive (A) and the adhesive (B) is 60° C. or more and a difference in Young's modulus at 23° C. between the adhesive (A) and the adhesive (B) is 40 MPa or more.

Based on the finding, the present invention has been accomplished.

The present inventors have further found that a retardation film, which is obtained by stretch-orientating a film (referred to as a "cycloolefin resin film" hereinafter) using as a raw material a cycloolefin resin having excellent heat resistance, low hygroscopicity, excellent stability of phase difference and small dependence of phase difference on wavelength, is most suitably applied to a wave plate for optical information recording/reproducing devices and liquid crystal projectors, said wave plate having excellent initial properties, being hardly influenced by the usage environment and the production environment and having excellent long-term reliability.

EFFECT OF THE INVENTION

In the first wave plate of the invention, two or more retardation films are not bonded in the laser beam transmission area and a gap is present, and if necessary, the retardation film is fixed to a substrate in such a manner that the substrate is not present in the laser beam transmission area. Such a wave plate exhibits extremely small change of wavefront aberration over a long period of time and can maintain high performance. By the use of the first wave plate of the invention, an optical information recording/reproducing device or a liquid crystal projector device capable of maintaining high performance over a long period of time can be produced.

In the second wave plate of the invention, at least two retardation films are laminated on each other, on at least one surface of the laminated retardation films a glass substrate is laminated, and the retardation films, and the retardation film and the glass substrate are lamination-fixed respectively with different adhesives which are selected from the adhesives (A) and (B). Such a wave plate is inexpensive, exhibits extremely small change of wavefront aberration over a long period of time and can maintain high performance. By the use of the second wave plate of the invention, an optical information recording/reproducing device or a liquid crystal projector device, which is inexpensive and capable of maintaining high performance over a long period of time, can be produced.

BRIEF DESCRIPTION OF THE DRAWINGS

FIG. 1(a) is a view observed from the top, and FIG. 1(b) is a view observed from the side.

FIG. 2(a) is a view observed from the top, and FIG. 2(b) is a view observed from the side.

BEST MODE FOR CARRYING OUT THE INVENTION

Figure 1:
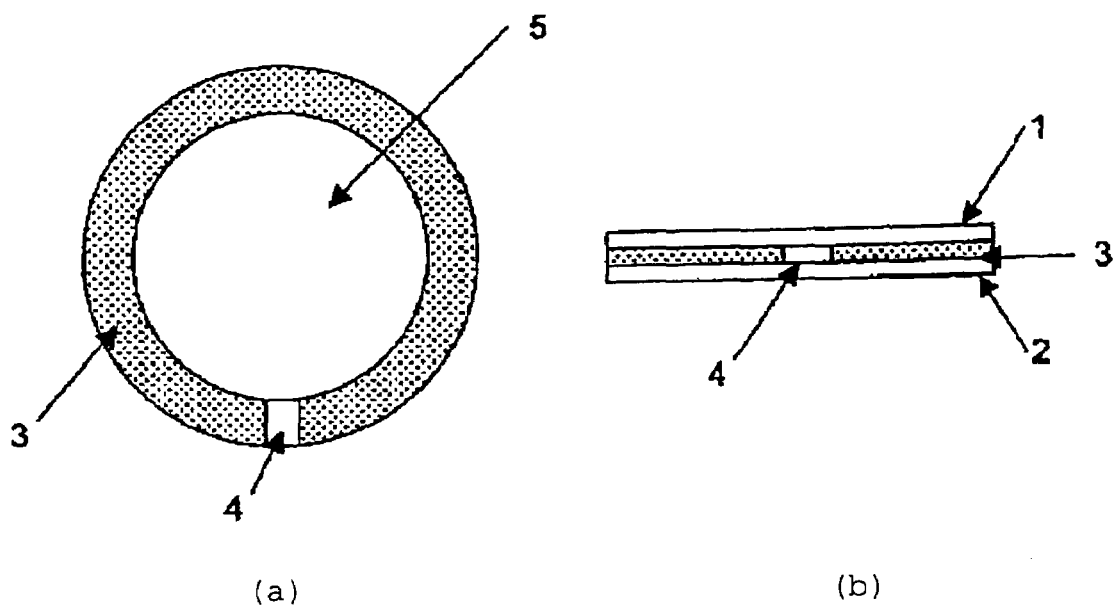
FIG. 1 is a group of constitutional views of a wave plate prepared in Example 1.

The present invention is described in more detail hereinafter.

Examples of the retardation films used for the first and the second wave plates of the invention include films obtained by stretch-orientating transparent resin films, such as films of polycarbonate (PC), triacetyl acetate (TAC), polyvinyl alcohol (PVA), polyvinyl butyral (PVB), polyethylene terephthalate (PET), polypropylene (PP), polyallylate, polysulfone, polyether sulfone, acrylic resin and cycloolefin resins. Of these, films obtained by stretch-orientating the cycloolefin resin films are preferably employed.

Examples of cycloolefin resins preferably used for the retardation films in the invention include the following (co)polymers:

(1) a ring-opened polymer of a cycloolefin represented by the following formula (I) (referred to as a "specific monomer" hereinafter), (2) a ring-opened copolymer of the specific monomer and a copolymerizable monomer, (3) a hydrogenated (co)polymer of the ring-opened (co)polymer (1) or (2), (4) a (co)polymer obtained by cyclizing the ring-opened (co)polymer (1) or (2) by Friedel-Crafts reaction and then hydrogenating the reaction product, (5) a saturated copolymer of the specific monomer and an unsaturated double bond-containing compound, (6) an addition type (co)polymer of one or more monomers selected from the specific monomer, a vinyl cyclic hydrocarbon monomer and a cyclopentadiene monomer, or its hydrogenated (co)polymer, and (7) an alternating copolymer of the specific monomer and an acrylate.

Formula (I)

wherein $R^1$ to $R^4$ are each a hydrogen atom, a halogen atom, a hydrocarbon group of 1 to 30 carbon atoms or another monovalent organic group and may be the same or different, $R^1$ and $R^2$ or $R^3$ and $R^4$ may be united to form a divalent hydrocarbon group, $R^1$ or $R^2$ and $R^3$ or $R^4$ may be bonded to each other to form a monocyclic or polycyclic structure, m is 0 or a positive integer, and p is 0 or a positive integer.

Specific Monomer

Examples of the specific monomers include the following compounds, but the present invention is not limited to these examples;

bicyclo[2.2.1]hept-2-ene,
tricyclo[4.3.0.1$^{2,5}$]-8-decene,
tricyclo[4.4.0.1$^{2,5}$.1$^{7,10}$]-3-undecene,
tetracyclo[4.4.0.1$^{2,5}$.1$^{7,10}$]-3-dodecene,
pentacyclo[6.5.1.1$^{3,6}$.0$^{2,7}$.0$^{9,13}$]-4-pentadecene,
5-methylbicyclo[2.2.1]hept-2-ene,
5-ethylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-cyanobicyclo[2.2.1]hept-2-ene,
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
5-ethylidenebicyclo[2.2.1]hept-2-ene,
8-ethylidenetetracyclo[4.4.0.1$^{2,5}$.1$^{7,10}$]-3-dodecene,
5-phenylbicyclo[2.2.1]hept-2-ene,
8-phenyltetracyclo[4.4.0.1$^{2,5}$.1$^{7,10}$]-3-dodecene,
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(fluoromethyl)bicyclo[2.2.1]hept-2-ene,
5,5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-5-trifluoromethylbicyclo[2.2.1]hept-2-ene,
5-fluoro-5-pentafluoroethyl-6,6-bis(trifluoromethyl)bicyclo[2.2.1]hept-2-ene,
5,6-difluoro-5-pentafluoro-isopropyl-6-trifluoromethylbicyclo[2.2.1]hept-2-ene,
5-chloro-5,5,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5, 5, 6-trifluoro-6-heptafluoropropoxybicyclo[2.2.1]hept-2-ene,
8-fluorotetracyclo[4.4.0.1$^{2,5}$.1$^{7,10}$]-3-dodecene,
8-fluoromethyltetracyclo[4.4.0.1$^{2,5}$.1$^{7,10}$]-3-dodecene,
8-difluoromethyltetracyclo[4.4.0.1$^{2,5}$.1$^{7,10}$]-3-dodecene,
8-trifluoromethyltetracyclo[4.4.0.1$^{2,5}$.1$^{7,10}$]-3-dodecene,
8-pentafluoroethyltetracyclo[4.4.0.1$^{2,5}$.1$^{7,10}$]-3-dodecene,
8,8-difluorotetracyclo[4.4.0.1$^{2,5}$.1$^{7,10}$]-3-dodecene,
8,9-difluorotetracyclo[4.4.0.1$^{2,5}$.1$^{7,10}$]-3-dodecene,
8,8-bis(trifluoromethyl)tetracyclo[4.4.0.1$^{2,5}$.1$^{7,10}$]-3-dodecene,
8,9-bis(trifluoromethyl)tetracyclo[4.4.0.1$^{2,5}$.1$^{7,10}$]-3-dodecene,
8-methyl-8-trifluoromethyltetracyclo[4.4.0.1$^{2,5}$.1$^{7,10}$]-3-dodecene,
8,8,9-trifluorotetracyclo[4.4.0.1$^{2,5}$.1$^{7,10}$]-3-dodecene,
8,8,9-tris(trifluoromethyl)tetracyclo[4.4.0.1$^{2,5}$.1$^{7,10}$]-3-dodecene,
8,8,9,9-tetrafluorotetracyclo[4.4.0.1$^{2,5}$.1$^{7,10}$]-3-dodecene,
8,8,9,9-tetrakis(trifluoromethyl)tetracyclo[4.4.0.1$^{2,5}$.1$^{7,10}$]-3-dodecene,
8,8-difluoro-9,9-bis(trifluoromethyl)tetracyclo[4.4.0.1$^{2,5}$.1$^{7,10}$]-3-dodecene,
8,9-difluoro-8,9-bis(trifluoromethyl)tetracyclo[4.4.0.1$^{2,5}$.1$^{7,10}$]-3-dodecene,
8,8,9-trifluoro-9-trifluoromethyltetracyclo[4.4.0.1$^{2,5}$.1$^{7,10}$]-3-dodecene,
8,8,9-trifluoro-9-trifluoromethoxytetracyclo[4.4.0.1$^{2,5}$.1$^{7,10}$]-3-dodecene,
8,8,9-trifluoro-9-pentafluoropropoxytetracyclo[4.4.0.1$^{2,5}$.1$^{7,10}$]-3-dodecene,
8-fluoro-8-pentafluoroethyl-9,9-bis(trifluoromethyl)tetracyclo[4.4.0.1$^{2,5}$.1$^{7,10}$]-3-dodecene,
8,9-difluoro-8-heptafluoro-isopropyl-9-trifluoromethyltetracyclo[4.4.0.1$^{2,5}$.1$^{7,10}$]-3-dodecene,
8-chloro-8,9,9-trifluorotetracyclo[4.4.0.1$^{2,5}$.1$^{7,10}$]-3-dodecene, 8,9-dichloro-8,9-bis(trifluoromethyl)tetracyclo[4.4.0.1$^{2,5}$.1$^{7,10}$]-3-dodecene, 8-(2,2,2-trifluoroethoxycarbonyl)tetracyclo[4.4.0.1$^{2,5}$.1$^{7,10}$]-3-dodecene, and 8-methyl-8-(2,2,2-trifluoroethoxycarbonyl)tetracyclo[4.4.0.1$^{2,5}$.1$^{7,10}$]-3-dodecene.

The above compounds can be used singly or in combination of two or more kinds.

Of the specific monomers, preferable are those of the formula (I) wherein $R^1$ and $R^3$ are each a hydrogen atom or a hydrocarbon group of 1 to 10 carbon atoms, more preferably 1 to 4 carbon atoms, particularly preferably 1 to 2 carbon atoms, $R^2$ and $R^4$ are each a hydrogen atom or a monovalent organic group, at least one of $R^2$ and $R^4$ is a polar group having polarity other than a hydrogen atom and a hydrocarbon group, m is an integer of 0 to 3, and p is an integer of 0 to 3, more preferably m+p is 0 to 4, still more preferably m+p is 0 to 2, particularly preferably m=1 and m=0. A specific monomer wherein m=1 and p=0 is preferable because the resulting cycloolefin resin has a high glass transition temperature and shows excellent mechanical strength.

Examples of the polar groups of the specific monomers include carboxyl group, hydroxyl group, alkoxycarbonyl group, allyloxycarbonyl group, amino group, amide group and cyano group. These polar groups may be bonded through a linkage such as methylene group. Further, a hydrocarbon group bonded through a linkage of a divalent organic group having polarity, such as carbonyl group, ether group, silyl ether group, thioether group or imino group, is also available as a polar group. Of the above groups, preferable is carboxyl group, hydroxyl group, alkoxycarbonyl group or allyloxycarbonyl group, and particularly preferable is alkoxycarbonyl group or allyloxycarbonyl group.

A monomer wherein at least one of $R^2$ and $R^4$ is a polar group represented by the formula —(CH$_2$)$_n$COOR is preferable because the resulting cycloolefin resin has a high glass transition temperature, low hygroscopicity and excellent adhesion to various materials. In the above formula representing the specific polar group, R is a hydrocarbon group of 1 to 12 carbon atoms, preferably 1 to 4 carbon atoms, particularly preferably 1 to 2 carbon atoms, and is preferably an alkyl group. Although n is a number of usually 0 to 5, a smaller value is preferable because the resulting cycloolefin resin has a higher glass transition temperature, and a specific monomer wherein n is 0 is preferable because synthesis thereof is easy.

In the formula (I), $R^1$ or $R^3$ is preferably an alkyl group, more preferably an alkyl group of 1 to 4 carbon atoms, still more preferably an alkyl group of 1 to 2 carbon atoms, particularly preferably a methyl group, and in particular, it is preferable that this alkyl group is bonded to the same carbon atom as a carbon atom to which the aforesaid specific polar group represented by the formula —(CH$_2$)$_n$COOR is bonded because hygroscopicity of the resulting cycloolefin resin can be lowered.

Copolymerizable Monomer

Examples of the copolymerizable monomers include cycloolefins, such as cyclobutene, cyclopentene, cycloheptene, cyclooctene and dicyclopentadiene. The number of carbon atoms of the cycloolefin is in the range of preferably 4 to 20, more preferably 5 to 12. These monomers can be used singly or in combination of two or more kinds. The specific monomer and the copolymerizable monomer are used in a specific monomer/copolymerizable monomer ratio by weight of preferably 100/0 to 50/5, more preferably 100/0 to 60/40.

Ring-Opening Polymerization Catalyst

In the present invention, ring-opening polymerization for obtaining (1) the ring-opened polymer of the specific monomer and (2) the ring-opened copolymer of the specific monomer and a copolymerizable monomer is carried out in the presence of a metathesis catalyst.

The metathesis catalyst is a catalyst comprising a combination of (a) at least one compound selected from compounds of W, Mo and Re and (b) at least one compound selected from compounds containing IA Group elements of Deming's periodic table (e.g., Li, Na and K), IIA Group elements thereof (e.g., Mg and Ca), IIB Group elements thereof (e.g., Zn, Cd and Hg), IIIA Group elements thereof (e.g., B and Al), IVA Group elements thereof (e.g., Si, Sn and Pb) or IVB Group elements thereof (e.g., Ti and Zr) and having at least one said element-carbon bond or said element-hydrogen bond. In order to enhance catalytic activity, the metathesis catalyst may contain the later-described additive (c).

Typical examples of the compounds of W, Mo or Re suitable as the components (a) include compounds described from the 6th line on the lower left-hand section in Page 8 to the 17th line on the upper right-hand section in Page 8 in Japanese Patent Laid-Open Publication No. 132626/1989, such as WCl$_6$, MoCl$_6$ and ReOCl$_3$.

Examples of the components (b) include compounds described from the 18th line on the upper right-hand section in Page 8 to the 3rd line on the lower right-hand section in Page 8 in Japanese Patent Laid-Open Publication No. 132626/1989, such as n-C$_4$H$_9$Li, (C$_2$H$_5$)$_3$Al, (C$_2$H$_5$)$_2$AlCl, (C$_2$H$_5$)$_{1.5}$AlCl$_{1.5}$, (C$_2$H$_5$)Al$_2$, methylalumoxane and LiH.

Typical examples of the components (c) preferably employable as the additives include alcohols, aldehydes, ketones and amines. Moreover, compounds described from the 16th line on the lower right-hand section in Page 8 to the 17th line on the upper left-hand section in Page 9 in Japanese Patent Laid-Open Publication No. 132626/1989 are also employable.

The metathesis catalyst is used in such an amount that the molar ratio between the component (a) and the specific monomer (component (a):specific monomer) becomes usually 1:500 to 1:50,000, preferably 1:1,000 to 1:10,000.

The ratio between the component (a) and the component (b) ((a):(b)) is in the range of 1:1 to 1:50, preferably 1:2 to 1:30, as a metal atom ratio.

The ratio between the component (c) and the component (a) ((c):(a)) is in the range of 0.005:1 to 15:1, preferably 0.05:1 to 7:1, as a molar ratio.

Polymerization Reaction Solvent

Examples of solvents (solvents for constituting molecular weight modifier solution, solvents for specific monomer and/or metathesis catalyst) for use in the ring-opening polymerization reaction include alkanes, such as pentane, hexane, heptane, octane, nonane and decane; cycloalkanes, such as cyclohexane, cycloheptane, cyclooctane, decalin and norbornane; aromatic hydrocarbons, such as benzene, toluene, xylene, ethylbenzene and cumene; halogenated alkanes or aryl halides, such as chlorobutane, bromohexane, methylene chloride, dichloroethane, hexamethylene dibromide, chlorobenzene, chloroform and tetrachloroethylene; saturated carboxylic acid esters, such as ethyl acetate, n-butyl acetate, isobutyl acetate, methyl propionate and dimethoxyethane; and ethers, such as dibutyl ether, tetrahydrofuran and dimethoxyethane.

The solvent is used in such an amount that the ratio between the solvent and the specific monomer (solvent:specific monomer, by weight) becomes usually 1:10 to 10:1, preferably 1:1 to 5:1.

Molecular Weight Modifier

The molecular weight of the resulting ring-opened (co)polymer can be controlled by polymerization temperature, type of the catalyst and type of the solvent, but in the present invention, it is controlled by allowing a molecular weight modifier to be present in the reaction system.

Examples of preferred molecular weight modifiers include α-olefins, such as ethylene, propene, 1-butene, 1-pentene, 1-hexene, 1-heptene, 1-octene, 1-nonene and 1-decene, and styrene. Of these, 1-butene and 1-hexene are particularly preferable.

These molecular weight modifiers can be used singly or as a mixture of two or more kinds. The molecular weight modifier is used in an amount of 0.005 to 0.6 mol, preferably 0.02 to 0.5 mol, based on 1 mol of the specific monomer used in the ring-opening polymerization reaction.

For obtaining the ring-opened copolymer (2), the specific monomer and the copolymerizable monomer may be subjected to ring-opening copolymerization in the ring-opening polymerization process, and further, the specific monomer may be subjected to ring-opening polymerization in the presence of an unsaturated hydrocarbon polymer containing two or more carbon-carbon double bonds in the main chain, such as a conjugated diene compound (e.g., polybutadiene or polyisoprene), a styrene/butadiene copolymer, an ethylene/non-conjugated diene copolymer or polynorbornene.

The ring-opened (co)polymer obtained as above can be used as it is, but a hydrogenated (co)polymer (3) obtained by hydrogenating an olefinically unsaturated bond in a molecule of the ring-opened (co)polymer is preferable because it has excellent resistance to thermal coloration and excellent light resistance and can improve durability of a retardation film.

Hydrogenation Catalyst

To the hydrogenation reaction, a usual method of hydrogenating an olefinically unsaturated bond is applicable. That is to say, a hydrogenation catalyst is added to a solution of the ring-opened polymer, and a hydrogen gas of atmospheric pressure to 300 atm, preferably 3 to 200 atm, is allowed to act on the solution at a temperature of 0 to 200° C., preferably 20 to 180° C.

As the hydrogenation catalyst, a catalyst used for usual hydrogenation reaction of an olefinic compound is employable. The hydrogenation catalyst may be a homogeneous catalyst or a heterogeneous catalyst.

Examples of the heterogeneous catalysts include solid catalysts wherein noble metal catalytic substances, such as palladium, platinum, nickel, rhodium and ruthenium, are supported on carriers, such as carbon, silica, alumina and titania. Examples of the homogeneous catalysts include nickel naphthenate/triethylaluminum, nickel acetylacetonate/triethylaluminum, cobalt octenate/n-butyllithium, titanocene dichloride/diethylaluminum monochloride, rhodium acetate, chlorotris(triphenylphosphine)rhodium, dichlorotris(triphenylphosphine)ruthenium, chlorohydrocarbonyltris(triphenylphosphine)ruthenium and dichlorocarbonyltris(triphenylphosphine) ruthenium. The catalyst may be in the form of a powder or particles.

The hydrogenation catalyst is used in such an amount that the ratio between the ring-opened (co)polymer and the hydrogenation catalyst (ring-opened (co)polymer:hydrogenation catalyst, by weight) becomes $1:1\times10^{-6}$ to 1:2.

The degree of hydrogenation of the hydrogenated (co)polymer, as measured by $^1$H-NMR at 500 MHz, of not less than 50%, preferably not less than 90%, more preferably not less than 98%, most preferably not less than 99%. As the degree of hydrogenation is increased, stability to heat or light becomes more excellent, and when such a (co)polymer is used for the wave plate of the invention, stable properties can be obtained over a long period of time.

In the case where the ring-opened (co)polymer has an aromatic group in a molecule, the aromatic group rarely lowers heat coloring property or light resistance and on the contrary sometimes exhibits advantages in optical properties such as refractive index and wavelength dispersion, so that such a (co)polymer does not necessarily have to be hydrogenated.

As the cycloolefin resin for the present invention, (4) a (co)polymer obtained by cyclizing the ring-opened (co)polymer (1) or (2) by Friedel-Crafts reaction and then hydrogenating the reaction product is also employable.

Cyclization by Friedel-Crafts Reaction

Although the method to cyclize the ring-opened (co)polymer (1) or (2) by Friedel-Crafts reaction is not specifically restricted, a publicly known method using an acid compound described in Japanese Patent Laid-Open Publication No. 154339/1975 is adoptable. As the acid compound, Lewis acid, such as $AlCl_3$, $BF_3$, $FeCl_3$, $Al_2O_3$, HCl, $CH_3ClCOOH$, zeolite or activated clay, or Brønsted acid is employable.

The cyclized ring-opened (co)polymer can be hydrogenated in the same manner as used for the ring-opened (co)polymer (1) or (2).

As the cycloolefin resin for the present invention, further, (5) a saturated copolymer of the specific monomer and an unsaturated double bond-containing compound is also employable.

Unsaturated Double Bond-Containing Compound

Examples of the unsaturated double bond-containing compounds include olefin compounds of preferably 2 to 12 carbon atoms, more preferably 2 to 8 carbon atoms, such as ethylene, propylene and butene.

The specific monomer/unsaturated double bond-containing compound ratio by weight is in the range of preferably 90/10 to 40/60, more preferably 85/15 to 50/50.

In order to obtain (5) the saturated copolymer of the specific monomer and the unsaturated double bond-containing compound, a usual addition polymerization process can be employed in the invention.

Addition Polymerization Catalyst

As a catalyst for synthesizing the saturated copolymer (5), at least one compound selected from a titanium compound, a zirconium compound and a vanadium compound and an organoaluminum compound as a co-catalyst are employed.

Examples of the titanium compounds include titanium tetrachloride and titanium trichloride, and examples of the zirconium compounds include bis(cyclopentadienyl)zirconium chloride and bis(cyclopentadienyl)zirconium dichloride.

As the vanadium compound, a vanadium compound represented by the formula $VO(OR)_aX_b$ or $V(OR)_cX_d$ (R is a hydrocarbon group, X is a halogen atom, $0 \leq a \leq 3$, $0 \leq b \leq 3$, $2 \leq (a+b) \leq 3$, $0 \leq c \leq 4$, $0 \leq d \leq 4$ and $3 \leq (c+d) \leq 4$), or an electron donor adduct of the vanadium compound is employed.

Examples of the electron donors include acid-containing electron donors, such as alcohol, phenols, ketone, aldehyde, carboxylic acid, ester of organic acid or inorganic acid, ether, acid amide, acid anhydride and alkoxysilane; and nitrogen-containing electron donors, such as ammonia, amine, nitrile and isocyanate.

As the organoaluminum compound that is a co-catalyst, at least one compound selected from compounds having at least one aluminum-carbon bond or aluminum-hydrogen bond is employed.

In the case where a vanadium compound is used, the ratio of an aluminum atom of the organoaluminum compound to a vanadium atom of the vanadium compound (Al/V) is not less than 2, preferably 2 to 50, particularly preferably 3 to 20.

As a polymerization reaction solvent for use in the addition polymerization, the same solvent as used for the ring-opening polymerization reaction is employable. Control of the molecular weight of the resulting saturated copolymer (5) is usually carried out by the use of hydrogen.

As the cycloolefin resin for the present invention, further, (6) an addition type copolymer of one or more monomers selected from the specific monomer, a vinyl cyclic hydrocarbon monomer and a cyclopentadiene monomer, or its hydrogenated (co)polymer is also employable.

Vinyl Cyclic Hydrocarbon Monomer

Examples of the vinyl cyclic hydrocarbon monomers include vinylated 5-member ring hydrocarbon monomers, such as vinylcyclopentene monomers, specifically 4-vinylcyclopentene and 2-methyl-4-isopropenylcyclopentene, and vinylcyclopentane monomers, specifically 4-vinylcyclopentane and 4-isopropenylcyclopentane; vinylcyclohexene monomers, such as 4-vinylcyclohexene, 4-isopropenylcyclohexene, 1-methyl-4-isopropenylcyclohexene, 2-methyl-4-vinylcyclohexene and 2-methyl-4-isopropenylcyclohexene; vinylcyclohexane monomers, such as 4-vinylcyclohexane and 2-methyl-4-isopropenylcyclohexane; styrene monomers, such as styrene, α-methylstyrene, 2-methylstyrene, 3-methylstyrene, 4-methylstyrene, 1-vinylnaphthalene, 2-vinylnaphthalene, 4-phenylstyrene and p-methoxystyrene; terpene monomers, such as d-terpene, l-terpene, diterpene, d-limonene, l-limonene and dipentene; vinylcycloheptene monomers, such as 4-vinylcycloheptene and 4-isopropenylcycloheptene; and vinylcycloheptane monomers, such as 4-vinylcycloheptane and 4-isopropenylcycloheptane. Of these, styrene and α-methylstyrene are preferable. These monomers are used singly or in combination of two or more kinds.

Cyclopentadiene Monomer

Examples of the cyclopentadiene monomers used as monomers for the addition type copolymer (6) include cyclopentadiene, 1-methylcyclopentadiene, 2-methylcyclopentadiene, 2-ethylcyclopentadiene, 5-methylcyclopentadiene and 5,5-methylcyclopentadiene. Of these, cyclopentadiene is preferable. These monomers are used singly or in combination of two or more kinds.

The addition type (co)polymer of one or more monomers selected from the specific monomer, the vinyl cyclic hydrocarbon monomer and the cyclopentadiene monomer can be obtained by the same addition polymerization process as used for preparing the saturated copolymer (5) of the specific monomer and the unsaturated double bond-containing compound.

The hydrogenated (co)polymer of the addition type (co) polymer can be obtained by the same hydrogenation as used for preparing the hydrogenated (co)polymer (3) of the ring-opened copolymer.

As the cycloolefin resin for the present invention, further, (7) an alternating copolymer of the specific monomer and an acrylate is also employable.

Acrylate

Examples of the acrylates used for preparing the alternating copolymer of the specific monomer and an acrylate include linear, branched or cyclic alkyl acrylates of 1 to 20 carbon atoms, such as methyl acrylate, 2-ethylhexyl acrylate and cyclohexyl acrylate, heterocyclic group-containing acrylates of 2 to 20 carbon atoms, such as glycidyl acrylate and 2-tetrahydrofurfuryl acrylate, aromatic cyclic group-containing acrylates of 6 to 20 carbon atoms, such as benzyl acrylate, and acrylates of polycyclic structure of 7 to 30 carbon atoms, such as isobornyl acrylate and dicyclopentanyl acrylate.

For obtaining the alternating copolymer (7) of the specific monomer and the acrylate in the invention, usually 30 to 70 mol of the specific monomer and 70 to 30 mol of the acrylate, preferably 40 to 60 mol of the specific monomer and 60 to 40 mol of the acrylate, particularly preferably 45 to 55 mol of the specific monomer and 55 to 45 mol of the acrylate, are subjected to radical polymerization in the presence of Lewis acid.

The amount of the Lewis acid used for obtaining the alternating copolymer (7) of the specific monomer and the acrylate is in the range of 0.001 to 1 mol based on 100 mol of the acrylate. Further, a publicly known organic peroxide that generates free radical or a publicly known radical polymerization initiator of azobis type is employable. The polymerization reaction temperature is in the range of usually −20 to 80° C., preferably 5 to 60° C. As the polymerization reaction solvent, the same solvent as used for the ring-opening polymerization reaction is employable.

The term "alternating copolymer" referred to in the invention means a copolymer having a structure wherein structural units derived from the specific monomer are not adjacent to each other, that is, a structural unit derived from the specific monomer is necessarily adjacent to a structural unit derived from the acrylate, and a structure wherein structural units derived from the acrylates are adjacent to each other is not denied.

The cycloolefin resin for use in the invention is selected from the ring-opened copolymers (1) and (2), the hydrogenated (co)polymers (3) and (4), the saturated copolymer (5), the addition type (co)polymer or its hydrogenated (co)polymer (6), and the alternating copolymer (7). To the cycloolefin resin, a publicly known antioxidant, ultraviolet light absorber or the like can be added to further stabilize the resin.

More specifically, antioxidants, such as 2,6-di-t-butyl-4-methylphenol, 2,2'-dioxy-3,3'-di-t-butyl-5,5'-dimethyldiphenylmethane and tetrakis[methylene-3-(3,5-di-t-butyl-4-hydroxyphenyl)propionato]methane, or ultraviolet light absorbers, such as 2,4-dihyroxybenzophenone and 2-hydroxy-4-methoxybenzophenone, can be added to stabilize the resin. In order to improve processability, additives such as lubricant can be added.

As preferred molecular weights of the cycloolefin resin for use in the invention, the intrinsic viscosity $[\eta]_{inh}$ is in the range of preferably 0.2 to 5 dl/g, more preferably 0.3 to 3 dl/g, particularly preferably 0.4 to 1.5 dl/g, the number-average molecular weight (Mn) in terms of polystyrene, as measured by gel permeation chromatograph (GPC), is in the range of preferably 8,000 to 100,000, more preferably 10,000 to 80,000, particularly preferably 12,000 to 50,000, and the weight-average molecular weight (Mw) in terms of polystyrene, as measured by gel permeation chromatograph (GPC), is in the range of preferably 20,000 to 300,000, more preferably 30,000 to 250,000, particularly preferably 40,000 to 200,000.

Because the intrinsic viscosity $[\eta]_{inh}$, the number-average molecular weight and the weight-average molecular weight are in the above ranges, a balance between properties of the cycloolefin resin, such as heat resistance, water resistance, chemical resistance and mechanical property, and stability of phase difference given when the resin is used for the wave plate of the invention becomes excellent.

The cycloolefin resin for use in the invention has a glass transition temperature (Tg) of usually not lower than 120° C., preferably 120 to 350° C., more preferably 130 to 250° C., particularly preferably 140 to 200° C. If Tg is lower than 120° C., change of optical properties of the resulting cycloolefin resin film is increased by heat from a laser beam source or its neighboring parts, so that such a temperature is undesirable. On the other hand, if Tg exceeds 350° C., there is a high possibility of heat deterioration of the resin when the resin is heated up to near Tg for processing such as stretching operation.

The gel content in the cycloolefin resin for use in the invention is desirably as small as possible, and it is usually not more than 5% by weight, preferably not more than 1% by weight. If the gel content is high, the gel sometimes becomes an optical defect when the resin is used for the wave plate.

The water saturation-absorption of the cycloolefin resin for use in the invention at 23° C. is in the range of preferably 0.05 to 2% by weight, more preferably 0.1 to 1% by weight. When the water saturation-absorption is in this range, phase difference is uniform, the resulting cycloolefin resin film exhibits excellent adhesion to a glass substrate or the like and is free from peeling during the use, and the resin has excellent compatibility with an antioxidant or the like and can be added in a large amount. If the water saturation-absorption is less than 0.05% by weight, the resulting cycloolefin resin film exhibits poor adhesion to a substrate such as a glass substrate or a transparent substrate and is liable to suffer peeling. On the other hand, if the water saturation-absorption exceeds 2% by weight, the cycloolefin resin film is liable to suffer dimensional change by water absorption.

The water saturation-absorption is a value obtained by measuring an increase in weight after the resin is immersed in water for 1 week at 23° C. in accordance with ASTM D570.

As the cycloolefin resin for use in the invention, a resin satisfying requirements of a photoelasticity coefficient ($C_P$) of 0 to 100 ($\times 10^{-12}$ Pa$^{-1}$) and a stress optical coefficient ($C_R$) of 1,500 to 4,000 ($\times 10^{-12}$ Pa$^{-1}$) is preferably employed.

The "photoelasticity coefficient ($C_P$)" and the "stress optical coefficient ($C_R$)" are described in various literatures (e.g., *Polymer Journal*, Vol. 27, No. 9, pp. 943-950 (1995), *Journal of Japan Rheological Society*, Vol. 19, No. 2, pp. 93-97 (1991), *Photoelasticity Experimental Method*, The Nikkan Kogyo Shinbun Ltd., the 7th edition, 1975) and are publicly known, and the former indicates degree of occurrence of phase difference due to a stress of a polymer in a glass state, while the latter indicates degree of occurrence of phase difference due to a stress of a polymer in a fluid state.

A large photoelasticity coefficient ($C_P$) means that in the case where a polymer is used in a glass state, the polymer is sensitive to a stress produced by an external factor or a strain of the frozen polymer itself and is liable to bring about phase difference, and for example, it means that unnecessary phase difference is easily produced by a slight stress that is brought about by residual strain given when the polymer is laminated or fixed to a substrate as in the present invention or shrinkage of a material accompanying change of temperature or change of humidity. For this reason, the photoelasticity coefficient ($C_P$) is desirably as small as possible.

On the other hand, a large stress optical coefficient ($C_R$) has great merits. For example, when the cycloolefin resin film is imparted with ability to exhibit phase difference, desired phase difference can be obtained with a low stretch ratio, or a film capable of giving a large phase difference is easily obtained, and when the same phase difference is desired, the film can be made thinner as compared with a film having a small stress optical coefficient ($C_R$).

From the above viewpoints, the photoelasticity coefficient ($C_P$) is in the range of preferably 0 to 100 ($\times 10^{-12}$ Pa$^{-1}$), more preferably 0 to 80 ($\times 10^{-12}$ Pa$^{-1}$), particularly preferably 0 to 50 ($\times 10^{-12}$ Pa$^{-1}$), much more preferably 0 to 30 ($\times 10^{-12}$ Pa$^{-1}$), most preferably 0 to 20 ($\times 10^{-12}$ Pa$^{-1}$). If the photoelasticity coefficient ($C_P$) exceeds 100 ($\times 10^{-12}$ Pa$^{-1}$), deviation from the permissible error range of an optimum angle between the optical axes in the lamination is brought about by change of phase difference that is caused by a stress produced when retardation films are laminated on each other, a stress produced when a retardation film is fixed to a substrate or change of usage environment, and when such a polymer is used for a wave plate, the transmitted light quantity is sometimes decreased, so that such a photoelasticity coefficient is undesirable.

The water vapor permeability of the cycloolefin resin for use in the invention, as measured regarding a film formed from the resin under the conditions of 40° C. and 90% RH, is in the range of usually 1 to 400 g/m$^2$·24 hr, preferably 5 to 350 g/m$^2$ 24 hr, more preferably 10 to 300 g/m$^2$·24 hr. When the water vapor permeability is in this range, change of properties due to water content in the adhesive (A) or the adhesive (B) used for laminating a substrate such as a glass plate or a transparent substrate on a retardation film or due to humidity of the environment where the wave plate is used can be reduced or avoided, so that such a value is desirable.

A cycoolefin resin film used for the first and the second wave plates of the invention can be obtained by forming the cycloolefin resin into a film or a sheet through melt molding or solution casting (solvent casting). Of these, solvent casting is preferable because uniformity of film thickness and surface smoothness become excellent. From the viewpoint of production cost, melt molding is preferable.

The method for obtaining the cycloolefin resin film by solvent casting is not specifically restricted, and a publicly known method has only to be adopted. For example, a method comprising dissolving or dispersing the cycloolefin resin in a solvent to give a solution of an appropriate concentration, pouring or applying the solution onto an appropriate carrier, drying the coating film and then peeling the dried film from the carrier is adoptable.

Various conditions of the method for obtaining the cycloolefin resin film by solvent casting are described below, but the invention is not limited to those conditions.

When the cycloolefin resin is dissolved or dispersed in a solvent, the concentration of the resin is set to usually 0.1 to 90% by weight, preferably 1 to 50% by weight, more preferably 10 to 35% by weight. If the concentration of the resin is less than the lower limit of the above range, it becomes difficult to ensure a thickness of a film. Further, there occurs another problem that it becomes difficult to obtain smoothness of film surface because of foaming accompanying solvent evaporation or the like. On the other hand, if the concentration exceeds the upper limit of the above range, solution viscosity becomes too high and the resulting cycloolefin resin film hardly has uniform thickness or uniform surface, so that such a concentration is undesirable.

The viscosity of the solution at room temperature is in the range of usually 1 to 1,000,000 mPa·s, preferably 10 to 100, 000 mPa·s, more preferably 100 to 50,000 mPa·s, particularly preferably 1,000 to 40,000 mPa·s.

Examples of the solvents used herein include aromatic solvents, such as benzene, toluene and xylene; cellosolve solvents, such as methyl cellosolve, ethyl cellosolve and 1-methoxy-2-propanol; ketone solvents, such as diacetone alcohol, acetone, cyclohexanone, methyl ethyl ketone and 4-methyl-2-pentanone; ester solvents, such as methyl lactate and ethyl lactate; cycloolefin solvents, such as cyclohexane, ethylcyclohexane and 1,2-dimethylcyclohexane; halogen-containing solvents, such as 2,2,3,3-tetrafluoro-1-propanol, methylene chloride and chloroform; ether solvents, such as tetrahydrofuran and dioxane; and alcohol solvents, such as 1-pentanol and 1-butanol.

Also by the use of a solvent having a SP value (solubility parameter) of usually 10 to 30 (MPa$^{1/2}$), preferably 10 to 25 (MPa$^{1/2}$), more preferably 15 to 25 (MPa$^{1/2}$), particularly preferably 15 to 20 (MPa$^{1/2}$), a cycloolefin resin film having excellent surface uniformity and excellent optical properties can be obtained.

The solvents mentioned above can be used singly or as a mixture of plural kinds. When the solvents are used as a mixture, the SP value of the mixture system is preferably set in the above range. The SP value of the mixture system can be estimated from weight ratios, and in case of a mixture of two kinds of solvents, the SP value of the mixture system having weight fractions of W1 and W2 and SP values of SP1 and SP2 can be determined by the following formula:

$$SP\ value = W1 \cdot SP1 + W2 \cdot SP2$$

For producing the cycloolefin resin film by solvent casting, a method comprising applying the aforesaid solution onto a substrate, e.g., a metallic drum, a steel belt, a polyester film such as a film of polyethylene terephthalate (PET) or polyethylene naphthalate (PEN), or a polytetrafluoroethylene (trade name: Teflon®) belt, using a die or a coater, drying the coating film and peeling the dried film from the substrate is generally available. The cycloolefin resin film can be obtained also by applying the solution using spraying, brushing, roll spin coating, dipping or the like, then drying the resulting coating film and peeling the dried film from the substrate. The thickness or the surface smoothness may be controlled by repeatedly applying the solution.

The drying in the solvent casting process is not specifically restricted, and a drying method generally used, for example, a method of passing the coating film in an oven through many rollers is employable. If bubbles are formed with evaporation of the solvent in the drying, film properties are markedly lowered, and in order to avoid this, it is preferable to provide two or more drying steps and to control a temperature and an air flow in each drying step.

The amount of a residual solvent in the cycloolefin resin film is usually not more than 10% by weight, preferably not more than 5% by weight, more preferably not more than 1% by weight, particularly preferably not more than 0.5% by weight. If the amount of the residual solvent exceeds 10% by weight, dimensional change with time is increased when the film is practically used, so that such an amount is undesirable. Moreover, Tg is lowered by the residual solvent and heat resistance is also lowered, so that such an amount is undesirable.

In order to favorably carry out the later-described stretching, the amount of the residual solvent needs to be properly controlled within the above range. More specifically, in order to stably and uniformly exhibit phase difference in the stretch-orientation operation, the amount of the residual solvent is sometimes adjusted to usually 10 to 0.1% by weight, preferably 5 to 0.1% by weight, more preferably 1 to 0.1% by weight.

By allowing the solvent to remain in a slight amount, stretching operation is sometimes facilitated or control of phase difference is sometimes facilitated.

The thickness of the cycloolefin resin film for use in the invention is in the range of usually 0.1 to 500 μm, preferably 0.1 to 300 μm, more preferably 1 to 250 μm. If the thickness is less than 0.1 μm, handling of the film becomes substantially difficult. On the other hand, if the thickness exceeds 500 μm, it becomes difficult to take up the film in the form of a roll. Moreover, transmittance is lowered, so that such a thickness is undesirable for the wave plate of the invention whose purpose is high transmission of light such as laser beam.

The thickness distribution of the cycloolefin resin film for use in the invention is usually within ±20%, preferably within ±10%, more preferably within ±15%, particularly preferably within ±3%, based on the mean value. Further, variability of thickness based on 1 cm is usually not more than 10%, preferably not more than 5%, more preferably not more than 1%, particularly preferably not more than 0.5%. By controlling the thickness as above, non-uniformity of phase difference in the stretch orientation can be prevented.

As a retardation film comprising the cycloolefin resin film, which is used for the first and the second wave plates of the invention, a film obtained by stretching the cycloolefin resin film that is obtained by the above process is preferably employed. More specifically, the retardation film can be produced by publicly known monoaxial stretching or biaxial stretching. That is to say, crosswise monoaxial stretching by tentering, compression stretching between rolls, lengthwise monoaxial stretching using rolls of different circumferences, biaxial stretching using a combination of crosswise monoaxial stretching and lengthwise monoaxial stretching, stretching by inflation, etc. are employable.

In case of monoaxial stretching, the stretching rate is in the range of usually 1 to 5,000%/min, preferably 50 to 1,000%/min, more preferably 100 to 1,000%/min, particularly preferably 100 to 500%/min.

In case of biaxial stretching, there are a case where stretching is carried out in two directions simultaneously and a case where after monoaxial stretching, stretching is carried out in a different direction from the direction of the initial stretching. In these cases, the angle at which two of the stretch axes intersect is usually in the range of 120 to 60 degrees. The stretching rates in two directions may be the same or different, and are each in the range of usually 1 to 5,000%/min, preferably 50 to 1,000%/min, more preferably 100 to 1,000%/min, particularly preferably 100 to 500%/min.

The stretching temperature is not specifically restricted. However, on the basis of the glass transition temperature (Tg) of the cycloolefin resin of the invention, the stretching temperature is usually Tg±30° C., preferably Tg±20° C., more preferably Tg−5 to Tg+10° C. By setting the stretching temperature in the above range, it becomes possible to inhibit occurrence of non-uniformity of phase difference, and control of index ellipsoid is facilitated, so that such a temperature is preferable.

The stretch ratio is not specifically restricted because it is determined according to the desired properties. However, the stretch ratio is in the range of usually 1.01 to 10 times, preferably 1.1 to 5 times, more preferably 1.1 to 3.5 times. If the stretch ratio exceeds 10 times, control of phase difference sometimes becomes difficult.

Although the stretched film may be cooled as it is, it is preferable to allow the stretched film to stand still in an atmosphere of a temperature of Tg−20° C. to Tg for not shorter than 10 seconds, preferably 30 seconds to 60 minutes, more preferably 1 minute to 60 minutes. By virtue of this, a retardation film comprising the cycloolefin resin film, which is almost free from change of phase difference with time and is stable, can be obtained.

The linear expansion coefficient of the cycloolefin resin film for use in the invention in the temperature range of 20 to 100° C. is preferably not more than $1\times10^{-4}$ (1/° C.), more preferably not more than $9\times10^{-5}$ (1/° C.), particularly preferably not more than $8\times10^{-5}$ (1/° C.), most preferably not more than $7\times10^{-5}$ (1/° C.). In case of a retardation film, a difference in linear expansion coefficient between the stretching direction and the direction perpendicular to the stretching direction is preferably not more than $5\times10^{-5}$ (1/° C.), more preferably not more than $3\times10^{-5}$ (1/° C.), particularly preferably not more than $1\times10^{-5}$ (1/° C.). By setting the linear expansion coefficient in the above range, change of phase difference caused by change of stress that is brought about by the influence of temperature and humidity in the use of a wave plate can be restrained when a retardation film comprising the cycloolefin resin film is used for the wave plate of the invention, and long-term stability of properties can be obtained when the retardation film is used for the wave plate of the invention.

In the film stretched as above, molecules are orientated by the stretching and give a phase difference to the transmitted light. This phase difference can be controlled by a phase difference value of the film prior to stretching and a stretch ratio, a stretching temperature, and a thickness of the film after stretch orientation. The phase difference is defined as a product (Δnd) of a refractive index difference (Δn) of double-refracted light and a thickness (d).

In the case where the film prior to stretching has a constant thickness, there is a tendency that an absolute value of phase difference becomes larger as a stretch ratio of a film is increased, so that by changing the stretch ratio, a retardation film giving a desired phase difference value can be obtained.

In the first and the second wave plates of the invention, at least two retardation films are used, and in order to obtain desired optical properties as a wave plate, the phase difference values of the retardation films may be the same or different. In general, the phase difference value based on one plate is preferably not more than 2,000 nm, more preferably not more than 1,500 nm, still more preferably not more than 1,000 nm, though it depends upon the desired optical properties of the wave plate. If the phase difference value based on one plate is more than 2,000 nm, non-uniformity of film thickness and non-uniformity of phase difference are increased because of too high stretch ratio, so that such a phase difference value is undesirable. In the case where a retardation film giving a phase difference value of more than 2,000 nm is necessary, the above problem can be avoided by laminating plural retardation films each giving a phase difference value of not more than 2,000 nm in such a manner that the optical axes of the retardation films are made parallel with each other.

Although the optical properties of the first and the second wave plates of the invention are determined as desired and are not specifically restricted, there are known a wave plate functioning as a "¼ wave plate" and a wave plate functioning as a "½ wave plate" in the light wavelength region of 400 to 800 nm. Such a wave plate exhibiting a specific function in a wide band can be obtained by, for example, laminating two retardation films in such a manner that the optical axes of the films intersect each other, and the accuracy of the angle made by the intersecting optical axes is preferably within ±5° of the theoretical value, more preferably within ±3° thereof, still more preferably within ±1° thereof. If a deviation from the theoretical value of the angle between the optical axes is larger than 5°, desired optical properties are not obtained occasionally.

As the wave plate using two retardation films and functioning as a "¼ wave plate" in a wide band, a wave plate wherein two retardation films, one of which gives a phase difference of λ/2 to a light of a wavelength λ (nm) defined by the following formula (1) and the other of which gives a phase difference of λ/4 to a light of a wavelength λ (nm) defined by the following formula (1), are laminated so that their optical axes should intersect each other is preferably employed.

$$[(\lambda_S+\lambda_L)/2]-200\leq\lambda\leq[(\lambda_S+\lambda_L)/2]+200 \qquad \text{Formula (1)}$$

$\lambda_S$: wavelength (nm) of monochromatic light on the shortest wavelength side $\lambda_L$: wavelength (nm) of monochromatic light on the longest wavelength side In a combination of, for example, a retardation film R1 that is a first film from the side where a light such as a laser beam enters and gives a phase difference of 315 to 345 nm, preferably 320 to 340 nm, more preferably 325 to 335 nm, and a retardation film R2 that is a second film from said side and gives a phase difference of 150 to 180 nm, preferably 155 to 175 nm, more preferably 160 to 170 nm, the angle made by the optical axes of the two retardation films is in the range of usually 46 to 70 degrees, preferably 52 to 64 degrees, more preferably 56 to 60 degrees. In this case, if the incident light such as a laser beam is a linear polarized light, the angle made by a plane of polarization of the linear polarized light as the incident light (sometimes referred to as an "incident linear polarized light's polarization plane" hereinafter) and the optical axis of R1 is in the range of usually +70 to +82 degrees, preferably +72 to +80 degrees, more preferably +74 to +78 degrees, and the angle made by the incident linear polarized light's polarization plane and the optical axis of R2 is in the range of usually +12 to +24 degrees, preferably +14 to +22 degrees, more preferably +16 to +20 degrees. By setting the angles in the above ranges, a wide-band "¼ wave plate" having excellent polarization transfer function can be obtained. With respect to symbols of the angles, an anticlockwise angle is defined as plus and a clockwise angel is defined as minus when the film is seen from the side where the light enters (the same shall apply hereinafter).

In a combination of R1 giving a phase difference of 230 to 260 nm, preferably 235 to 255 nm, more preferably 240 to 250 nm, and R2 giving a phase difference of 110 to 140 nm, preferably 115 to 135 nm, more preferably 120 to 130 nm, the angle made by the optical axes may be in the range of usually 45 to 69 degrees, preferably 51 to 63 degrees, more preferably 55 to 59 degrees. In this case, if the incident light such as a laser beam is a linear polarized light, the angle made by the incident linear polarized light's polarization plane and the optical axis of R1 is in the range of usually +68 to +80 degrees, preferably +70 to +78 degrees, more preferably +72 to +76 degrees, and the angle made by the incident linear polarized light's polarization plane and the optical axis of R2 is in the range of usually +11 to +23 degrees, preferably +13 to +21 degrees, more preferably +15 to +19 degrees. By setting the angles in the above ranges, a wide-band "¼ wave plate" having excellent polarization transfer function can be obtained.

As the wave plate using two retardation films and functioning as a "¼ wave plate" in a wide band, a wave plate wherein two retardation films, one of which gives a phase difference of λ to a light of a wavelength λ (nm) defined by the aforesaid formula (1) and the other of which gives a phase difference of λ/4 or (3λ)/4 to a light of a wavelength λ (nm) defined by the aforesaid formula (1), are laminated so that their optical axes should intersect each other is also preferably employed.

In this case, in a combination of R1 giving a phase difference of 690 to 750 nm, preferably 700 to 740 nm, more preferably 710 to 730 nm, and R2 giving a phase difference of 165 to 195 nm, preferably 170 to 190 nm, more preferably 175 to 185 nm, the angle made by the optical axes of the two retardation films is in the range of usually 39 to 63 degrees, preferably 45 to 57 degrees, more preferably 49 to 53 degrees. In this case, if the incident light such as a laser beam is a linear polarized light, the angle made by the incident linear polarized light's polarization plane and the optical axis of R1 is in the range of usually −1 to −13 degrees, preferably −3 to −11 degrees, more preferably −5 to −9 degrees, and the angle made by the incident linear polarized light's polarization plane and the optical axis of R2 is in the range of usually +38 to +50 degrees, preferably +40 to +48 degrees, more preferably +42 to +46 degrees. By setting the angles in the above ranges, a wide-band "¼ wave plate" having excellent polarization transfer function can be obtained.

As the wave plate using two retardation films and functioning as a "½ wave plate" in a wide band, a wave plate wherein both of the two retardation films give a phase difference of λ/2 to a light of a wavelength λ (nm) defined by the aforesaid formula (1) and are laminated so that their optical axes should intersect each other is preferably employed.

In this case, in a combination of R1 and R2 each giving a phase difference of 260 to 290 nm, preferably 265 to 285 nm, more preferably 270 to 280 nm, the angle made by the optical axes of the two retardation films is in the range of usually 33 to 57 degrees, preferably 39 to 51 degrees, more preferably 43 to 47 degrees. In this case, if the incident light such as a laser beam is a linear polarized light, the angle made by the incident linear polarized light's polarization plane and the optical axis of R1 is in the range of usually +15 to +27 degrees, preferably +17 to +25 degrees, more preferably +19 to +23 degrees, and the angle made by the incident linear polarized light's polarization plane and the optical axis of R2 is in the range of usually +59 to +71 degrees, preferably +61 to +69 degrees, more preferably +63 to +67 degrees. By setting the angles in the above ranges, a wide-band "½ wave plate" having excellent polarization transfer function can be obtained.

In a combination of R1 and R2 each giving a phase difference of 235 to 265 nm, preferably 240 to 260 nm, more preferably 245 to 255 nm, the angle made by the optical axes may be in the range of usually 33 to 57 degrees, preferably 39 to 51 degrees, more preferably 43 to 47 degrees. In this case, if the incident light such as a laser beam is a linear polarized light, the angle made by the incident linear polarized light's polarization plane and the optical axis of R1 is in the range of usually +19 to +31 degrees, preferably +21 to +29 degrees, more preferably +23 to +27 degrees, and the angle made by the incident linear polarized light's polarization plane and the optical axis of R2 is in the range of usually +63 to +75 degrees, preferably +65 to +73 degrees, more preferably +67 to +71 degrees. By setting the angles in the above ranges, a wide-band "½ wave plate" having excellent polarization transfer function can be obtained.

As the wave plate using two retardation films and functioning as a "½ wave plate" in a wide band, a wave plate wherein two retardation films, one of which gives a phase difference of λ to a light of a wavelength λ (nm) defined by the aforesaid formula (1) and the other of which gives a phase difference of λ/2 to a light of a wavelength λ (nm) defined by the aforesaid formula (1), are laminated so that their optical axes should intersect each other is also preferably employed.

In this case, in a combination of R1 giving a phase difference of 690 to 750 nm, preferably 700 to 740 nm, more preferably 710 to 730 nm, and R2 giving a phase difference of 345 to 375 nm, preferably 350 to 370 nm, more preferably 355 to 365 nm, the angle made by the optical axes of the two retardation films is in the range of usually 50 to 73 degrees, preferably 54 to 67 degrees, more preferably 59 to 63 degrees. In this case, if the incident light such as a laser beam is a linear polarized light, the angle made by the incident linear polarized light's polarization plane and the optical axis of R1 is in the range of usually +67 to +79 degrees, preferably +69 to +77 degrees, more preferably +71 to +75 degrees, and the angle made by the incident linear polarized light's polarization plane and the optical axis of R2 is in the range of usually −40 to −52 degrees, preferably −42 to −50 degrees, more preferably −44 to −48 degrees. By setting the angles in the above ranges, a wide-band "½ wave plate" having excellent polarization transfer function can be obtained.

The first wave plate of the invention is a wave plate comprising two or more retardation films, wherein the retardation films are not bonded to each other in the laser beam transmission area and a gap is usually present between the retardation films. Although the thickness of the gap is not specifically restricted, it is preferably not more than 1 mm, more preferably not more than 0.5 mm, particularly preferably not more than 0.1 mm. In order to provide such a gap, irregularities may be formed on the film surfaces facing each other if necessary, within limits not detrimental to the optical properties. In this case, the surface roughness (Rmax) of the film is preferably not more than 10 μm, more preferably not more than 5 μm, particularly preferably 5 to 0.1 μm, most preferably 1 to 0.1 μm. By virtue of presence of a gap between the retardation films in the laser beam transmission area, deformation and shrinkage of each film caused by change of temperature or humidity in the usage environment can be restricted to each film unit, and influences exerted on each other can be minimized. Therefore, it becomes possible that aberration property and phase difference property of the wave plate of the invention are favorably exhibited over a long period of time from the early time.

In other area than the laser beam transmission area, the retardation films may be bonded with an adhesive, a sticking agent or the like, or may be held by being only interposed. However, the retardation films are preferably bonded because it can be inhibited that vibrations occurring when the wave plate is incorporated into equipment or vibrations occurring when the wave plate is used exert influence on the relationship between the optical axes of the retardation films. In the bonding of the retardation films to each other, an air pathway through which air present in the gap between the retardation films can freely come and go may be formed. By providing such an air pathway, properties excellent and stable to the environmental change such as change of temperature or humidity in the use of the wave plate can be maintained over a long period of time.

The expression "bonding of retardation films to each other" referred to in the invention includes not only a case where retardation films are directly bonded to each other but also a case where retardation films are bonded through a spacer or the like.

The first wave plate of the invention is preferably fixed to a substrate from the viewpoint of prevention of lowering of properties due to the production environment and the usage environment. Fixing of the wave plate may be carried out using a commercially available adhesive or sticking agent or may be carried out mechanically using pin, screw or the like.

The shape of the substrate is determined according to the desired properties and design and is not specifically restricted. However, preferable is such a shape that no substrate is present in the laser beam transmission area. In this case, a material of the substrate is not particularly limited and can be properly selected according to the cost, processability, production environment, usage environment, etc., and besides, it becomes possible to restrain influences of aberration of the substrate itself or influences of change of aberration or phase difference newly brought about when the retardation film is fixed to the substrate, as compared with such a shape that a substrate is present in the laser beam transmission area.

In case of such a shape that a substrate is present also in the laser beam transmission area, the substrate needs to be optically transparent as a matter of course, and its material is limited to a glass, a transparent resin or the like. In this case, the substrate is desired to be optically homogeneous, that is, the substrate is desired to have no birefringence property. If the substrate has birefringence property, there sometimes occurs a problem that desired properties are not obtained, or even if obtained, delicate correction becomes necessary. Moreover, it is preferable that the substrate and the retardation film are not bonded in the laser beam transmission area. Especially in case of a structure wherein retardation films are laminated through a substrate, the effect of the invention is not obtained occasionally if each retardation film is bonded to the substrate in the laser beam transmission area.

Examples of substrates having such a shape that no substrate is present in the laser beam transmission area include a U-shaped substrate, a circular substrate and a substrate of a circular shape a part of which is lacking. The thickness of the substrate is in the range of usually 0.01 to 5 mm, preferably 0.05 to 3 mm, more preferably 0.05 to 1 mm. If the thickness is less than 0.01 mm, the substrate has insufficient rigidity and poor handling property. On the other hand, if the thickness exceeds 5 mm, size of the wave plate becomes large, and miniaturization of an optical system device becomes difficult.

The substrate can be provided between the retardation films, can be provided on one surface or both surfaces of each retardation film, or can be provided on one surface or both surfaces of laminated retardation films. For the purpose of forming a stable gap between the retardation films, the substrate is preferably provided as a so-called spacer between the retardation films.

In the first wave plate of the invention, an antireflection film can be laminated on one surface or both surfaces of the retardation film.

The antireflection film can be formed by, for example, a process comprising dissolving a fluorine copolymer in an organic solvent, applying the solution onto the retardation film by casting or the like using a bar coater, and heating the coating film to cure it. The heating temperature is in the range of usually 80 to 165° C., preferably 100 to 150° C., and the hating time is in the range of usually 10 minutes to 3 hours, preferably 30 minutes to 2 hours.

The thickness of the antireflection film is in the range of usually 5 to 2,000 nm, preferably 10 to 1,000 nm, more preferably 50 to 200 nm. If the thickness is less than 5 nm, antireflection effect is not exerted. On the other hand, if the thickness exceeds 2,000 nm, the coating film is liable to have non-uniform thickness and thereby has bad appearance, so that such a thickness is undesirable.

The antireflection film can be also formed by providing a coating layer of a transparent inorganic oxide, such as aluminum, magnesium or silicon, by means of deposition or sputtering.

In case of such an inorganic antireflection film, the thickness of the transparent inorganic oxide coating layer is ¼ of the specific light wavelength. By multilayer-lamination of such transparent inorganic oxide coating layers, antireflection property can be further enhanced.

The adhesive or the sticking agent used for bonding the retardation films or the retardation film and the substrate in the first wave plate of the invention is appropriately selected from publicly known agents, such as those of natural rubber type, synthetic rubber type, vinyl acetate/vinyl chloride copolymer type, silicon type, polyvinyl ether type, acrylic type, modified polyolefin type, epoxy type and urethane type. Of these, an adhesive of acrylic type has excellent adhesion to an adherend and is preferably employed. Prior to bonding, the surface of the retardation film or the substrate may be subjected to surface treatment, such as corona treatment, plasma treatment, coupling agent treatment or anchor coat treatment.

When the adhesive or the sticking agent is used, the thickness of the adhesive layer or the sticking agent layer is in the range of preferably 1 μm to 100 μm, more preferably 2 μm to 70 μm, particularly preferably 3 μm to 50 μm, most preferably 4 μm to 30 μm. By setting the thickness of the adhesive layer or the sticking agent layer in this range, excellent aberration or excellent phase difference property is readily obtained and can be stably maintained over a long period of time.

As a matter of course, in-plane aberration (transmission wavefront aberration) of the first wave late of the invention is preferably as small as possible and is usually within 50 (mλ), preferably within 30 (mλ), more preferably within 20 (mλ). By setting the in-plane aberration in the above range, an excellent S/N ratio or a permissible jitter range is obtained, so that such an in-place aberration is preferable. The symbol λ denotes a wavelength of a transmitted light, and a wavelength of a laser beam is generally employed.

The number of foreign particles in the first wave plate of the invention is preferably as small as possible, and the number of foreign particles having a particle diameter of not less than 10 μm is usually not more than 5 (particles/mm$^2$), preferably not more than 1 (particle/mm$^2$), more preferably not more than 0 (particle/mm$^2$). If more than 5 (particles/mm$^2$) of the foreign particles having a particle diameter of not less than 10 μm are present, noise signals are increased and a S/N ratio is lowered, so that such a number is undesirable. The foreign particles in the wave plate include particles that lower transmission of a laser beam and particles the presence of which greatly changes the advance direction of a laser beam. Examples of the former particles include dust, dirt, burnt resin, metallic powder and powders of minerals. Examples of the latter particles include contaminants of other resins and transparent substances having different refractive index.

The first wave plate of the invention may be a wave plate having been colored with a known colorant or the like in order to cut or lower transmission of a light having a wavelength other than the desired wavelength in case of need such as reduction of noises.

The first wave plate of the invention can be produced in the same manner as in a hitherto known process except that two or more of the retardation films are not bonded in the laser beam transmission area.

In the first wave plate of the invention, two or more of the retardation films are not bonded in the laser beam transmission area, a gap is present between the retardation films, and further, other area than the laser beam transmission area is fixed to the substrate when needed. By the use of the wave plate of the invention, therefore, an optical information recording/reproducing device having long-term durability and excellent performance can be produced.

The second wave plate of the invention is a wave plate comprising at least two retardation films which are laminated on each other, on at least one surface of the laminated retardation films a glass substrate being laminated, wherein the retardation films, and the retardation film and the glass substrate are lamination-fixed respectively with different adhesives which are selected from the following adhesives (A) and (B). In the present invention, it is preferable that on both surfaces of the laminated retardation films glass substrates are laminated (structure wherein the laminated retardation films are sandwiched between two glass substrates), the retardation films are lamination-fixed to each other with the adhesive (A), and the retardation film and the glass substrate are fixed to each other with the adhesive (B).

The glass substrate used in the second wave plate of the invention is preferably a substrate substantially having no birefringence. A transparent substrate having birefringence is undesirable because it exerts influence on the properties of the wave plate. The shape of the glass substrate is not specifically restricted, and the substrate may be in a shape of a flat plate or in a shape having an optical function, such as a shape of a lattice or a prism. The thickness of the glass substrate is in the range of usually 0.01 to 5 mm, preferably 0.05 to 3 mm, more preferably 0.05 to 1 mm. If the thickness is less than 0.01 mm, the substrate has insufficient rigidity and poor handling property. On the other hand, if the thickness exceeds 5 mm, size of the wave plate becomes large, and miniaturization of an optical system device becomes difficult.

In the second wave plate of the invention, an antireflection film of the same thickness can be laminated on one surface or both surfaces of a glass substrate in the same manner as in the aforesaid first wave plate.

The antireflection film can be formed by, for example, a process comprising dissolving a fluorine copolymer in an organic solvent, applying the solution onto the above film or sheet material or the retardation film by casting or the like using a bar coater and heating the coating film with a press to cure the film. The heating temperature is in the range of usually 80 to 165° C., preferably 100 to 150° C., and the hating time is in the range of usually 10 minutes to 3 hours, preferably 30 minutes to 2 hours.

The thickness of the antireflection film is in the range of usually 5 to 2,000 nm, preferably 10 to 1,000 nm, more preferably 50 to 200 nm. If the thickness is less than 5 nm, antireflection effect is not exerted. On the other hand, if the thickness exceeds 2,000 nm, the coating film is liable to have non-uniform thickness and thereby has bad appearance, so that such a thickness is undesirable.

The antireflection film can be also formed by providing a coating layer of a transparent inorganic oxide, such as aluminum, magnesium or silicon, by means of deposition or sputtering.

In case of such an inorganic antireflection film, the thickness of the transparent inorganic oxide coating layer is ¼ of the specific light wavelength. By multilayer-lamination of such transparent inorganic oxide coating layers, antireflection property can be further enhanced.

The adhesive (adhesive (A)) used for lamination-fixing the retardation films in the second wave plate of the invention is appropriately selected from adhesives which are publicly known adhesives, such as adhesives of natural rubber type, synthetic rubber type, vinyl acetate/vinyl chloride copolymer type, silicon type, polyvinyl ether type, acrylic type, modified polyolefin type, epoxy type and urethane type, and have the following properties. Of these, an adhesive of acrylic type has excellent adhesion to an adherend and is preferably employed.

In order to obtain a wave plate which has excellent initial properties, is hardly influenced by the usage environment and the production environment and has excellent long-term reliability, a glass transition temperature of the adhesive (A), namely, a peak temperature of tan δ (loss tangent) in the dynamic viscoelasticity measurement (measuring frequency: 1 Hz) of the adhesive (A) in a dry or cured state, needs to be not higher than 0° C., and is desired to be preferably not higher than −20° C., more preferably not higher than −40° C.

In case of an acrylic adhesive, the glass transition temperature of the adhesive is controlled by properly selecting an acrylic polymer or an acrylic monomer contained in the adhesive. That is to say, acrylic monomers are classified into monofunctional, bifunctional and polyfunctional monomers according to the number of double bonds in a molecule, and in general, there is a tendency that an adhesive using a monofunctional acrylic monomer in a large amount has a low glass transition temperature and an adhesive using a polyfunctional acrylic monomer in a large amount has a high glass transition temperature. Therefore, by controlling the type or the amount of an acrylic monomer used for the polymerization to prepare an acrylic polymer added to the adhesive or by controlling the type or the amount of an acrylic monomer added to the adhesive, an adhesive having a desired glass transition temperature can be obtained.

The Young's modulus (value at a pulling rate of 10 mm/min, JIS Z1702, No. 3 dumbbell) of the adhesive (A) in a dry or cured state at room temperature (23° C.) needs to be not more than 10 MPa, and is desired to be preferably not more than 5 MPa, more preferably not more than 2 MPa.

Prior to the lamination-fixing, the surface of each retardation film may be subjected to surface treatment, such as corona treatment, plasma treatment, coupling agent treatment or anchor coat treatment.

The adhesive (adhesive (B)) used for bonding the retardation film to the glass substrate in the second wave plate of the invention is appropriately selected from adhesives which are publicly known adhesives, such as adhesives of natural rubber type, synthetic rubber type, vinyl acetate/vinyl chloride copolymer type, silicon type, polyvinyl ether type, acrylic type, modified polyolefin type, epoxy type and urethane type, and have the following properties. Of these, an adhesive of acrylic type has excellent adhesion to an adherend and is preferably employed.

In order to obtain a wave plate which has excellent initial properties, is hardly influenced by the usage environment and the production environment and has excellent long-term reliability, a glass transition temperature of the adhesive (B), namely, a peak temperature (glass transition temperature) of tan δ (loss tangent) in the dynamic viscoelasticity measurement (measuring frequency: 1 Hz) of the adhesive (B) in a dry or cured state, needs to be not lower than 40° C., and is desired to be preferably not lower than 60° C., more preferably not lower than 80° C. In the case where the adhesive (B) has two ore more peak temperatures, a peak temperature on the higher temperature side is adopted. In this case, the peak area of tan δ on the higher temperature side is desired to be preferably not less than 10%, more preferably not less than 30%, particularly preferably not less than 50%, based on all the peak areas of tan δ.

The Young's modulus (value at a pulling rate of 10 mm/min, JIS Z1702, No. 3 dumbbell) of the adhesive (B) in a dry or cured state at room temperature (23° C.) needs to be more than 30 MPa, and is desired to be preferably not less than 50 MPa, more preferably not less than 70 MPa.

A difference in glass transition temperature between the adhesive (A) and the adhesive (B) is desired to be 60° C. or more, preferably 80° C. or more, more preferably 100° C. or more.

A difference in Young's modulus at 23° C. between the adhesive (A) and the adhesive (B) is desired to be 40 MPa or more, preferably 50 MPa or more, more preferably 60 MPa or more.

Prior to the adhesion-fixing, the surface of the retardation film or the glass substrate may be subjected to surface treatment, such as corona treatment, plasma treatment, coupling agent treatment or anchor coat treatment.

By the use of a combination of the adhesive (A) and the adhesive (B) for laminating the retardation films on each other or laminating the glass substrate on the retardation film, change of in-plane aberration of the wave plate can be made small, and thereby the wave plate is hardly influenced by the usage environment or the production environment and has excellent long-term reliability.

Although the reason has not been made clear, it is presumed that deformation due to an external stress applied to the wave plate can be prevented by the use of the rigid adhesive (B), while strain that is caused by change of temperature can be relaxed by the use of the soft adhesive (A), and they are well balanced.

Examples of the adhesives of acrylic type include a composition comprising a polymer of a monomer composition containing at least one acrylic monomer (acrylate compound) and a solvent, a composition comprising at least one acrylate compound and a curing agent, and a composition comprising the above polymer, at least one acrylate compound and a curing agent, but the invention is not limited to these examples. The acrylate compound is a compound having at least one (meth)acryloyl group in a molecule and is, for example, a monofunctional (meth)acrylate compound or a polyfunctional (meth)acrylate compound.

Examples of the monofunctional (meth)acrylate compounds include:

alkyl(meth)acrylates, such as methyl(meth)acrylate, ethyl (meth)acrylate, propyl(meth)acrylate, isopropyl(meth)acrylate, butyl(meth)acrylate, isobutyl(meth)acrylate, tert-butyl (meth)acrylate, pentyl(meth)acrylate, amyl(meth)acrylate, isoamyl(meth)acrylate, hexyl(meth)acrylate, heptyl(meth) acrylate, octyl(meth)acrylate, isooctyl(meth)acrylate, 2-ethylhexyl(meth)acrylate, nonyl(meth)acrylate, decyl(meth) acrylate, isodecyl(meth)acrylate, undecyl(meth)acrylate, dodecyl(meth)acrylate, lauryl(meth)acrylate, stearyl(meth) acrylate and isostearyl(meth)acrylate;

hydroxyalkyl(meth)acrylates, such as hydroxyethyl(meth) acrylate, hydroxypropyl(meth)acrylate and hydroxybutyl (meth)acrylate;

phenoxyalkyl(meth)acrylates, such as phenoxyethyl (meth)acrylate and 2-hydroxy-3-phenoxypropyl(meth)acrylate;

alkoxyalkyl(meth)acrylates, such as methoxyethyl(meth) acrylate, ethoxyethyl(meth)acrylate, propoxyethyl(meth) acrylate, butoxyethyl(meth)acrylate and methoxybutyl (meth)acrylate;

polyethylene glycol(meth)acrylates, such as polyethylene glycol mono(meth)acrylate, ethoxydiethylene glycol(meth) acrylate, methoxypolyethylene glycol(meth)acrylate, phenoxypolyethylene glycol(meth)acrylate and nonylphenoxypolyethylene glycol(meth)acrylate;

polypropylene glycol(meth)acrylates, such as polypropylene glycol mono(meth)acrylate, methoxypolypropylene glycol(meth)acrylate, ethoxypolypropylene glycol(meth)acrylate and nonylphenoxypolypropylene glycol(meth)acrylate;

cycloalkyl(meth)acrylates, such as cyclohexyl(meth)acrylate, 4-butylcyclohexyl(meth)acrylate, dicyclopentanyl (meth)acrylate, dicyclopentenyl(meth)acrylate, dicyclopentadienyl(meth)acrylate, bornyl(meth)acrylate, isobornyl (meth)acrylate and tricyclodecanyl(meth)acrylate;

benzyl(meth)acrylate; and tetrahydrofurfuryl(meth)acrylate.

The above monofunctional (meth)acrylate compounds can be used singly or in combination of two or more kinds.

Examples of the polyfunctional (meth)acrylate compounds include:

alkylene glycol di(meth)acrylates, such as ethylene glycol di(meth)acrylate, diethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate and neopentyl glycol di(meth)acrylate;

poly(meth)acrylates of polyhydric alcohols, such as trimethylolpropane tri(meth)acrylate, trimethylolpropanetrihydroxyethyl tri(meth)acrylate, ditrimethylolpropane tetra (meth)acrylate, pentaerythritol tri(meth)acrylate, pentaerythritol tetra(meth)acrylate, dipentaerythritol hexa (meth)acrylate and hydroxypivalic neopentyl glycol di(meth) acrylate;

poly(meth)acrylates of isocyanurate, such as isocyanurate tri(meth)acrylate, tris(2-hydroxyethyl)isocyanurate di(meth) acrylate and tris(2-hydroxyethyl)isocyanurate tri(meth)acrylate;

poly(meth)acrylates of cycloalkanes, such as tricyclodecanediyldimethyl di(meth)acrylate;

(meth)acrylate derivatives of bisphenol A, such as di(meth) acrylate of ethylene oxide adduct of bisphenol A, di(meth) acrylate of propylene oxide adduct of bisphenol A, di(meth) acrylate of alkylene oxide adduct of bisphenol A, di(meth) acrylate of ethylene oxide adduct of hydrogenated bisphenol A, di(meth)acrylate of propylene oxide adduct of hydrogenated bisphenol A, di(meth)acrylate of alkylene oxide adduct of hydrogenated bisphenol A, and (meth)acrylate obtained from bisphenol A diglycidyl ether and (meth)acrylic acid; and fluorine-containing (meth)acrylates, such as 3,3,4,4,5,5,6, 6-octafluorooctane di(meth)acrylate, 3-(2-perfluorohexyl) ethoxy-1,2-di(meth)acryloylpropane and N-n-propyl-N-2,3-di(meth)acryloylpropyl perfluorooctylsulfonamide.

The above polyfunctional (meth)acrylate compounds can be used singly or in combination of two or more kinds.

The adhesive (A) and the adhesive (B) need to exhibit a bond strength such that peeling does not easily occur during handling. As a specific value of the bond strength, a 90° peel strength measured regarding two retardation films which are bonded with the adhesive (A) is preferably not less than 0.5 N/cm$^2$, more preferably not less than 1 N/cm$^2$, most preferably not less than 3 N/cm$^2$, and a 90° peel strength measured regarding a retardation film and a glass substrate which are bonded with the adhesive (B) is preferably not less than 0.5 N/cm$^2$, more preferably not less than 1 N/cm$^2$, most preferably not less than 3 N/cm$^2$. If the bond strength is less than 0.5 N/cm$^2$, peeling is brought about by an impact in the handling or the bonded layers are slipped off from each other, so that such a value is undesirable.

Although the thickness of the adhesive (A) or the adhesive (B) is not specifically restricted provided that the above-mentioned bond strength can be ensured, it is in the range of usually 1 μm to 100 μm, preferably 2 μm to 70 μm, more preferably 3 μm to 50 μm, most preferably 4 μm to 30 μm. If the thickness of the adhesive (A) or the adhesive (B) is larger than 100 μm, the thickness of the wave plate is increased to sometimes cause a problem in the optical properties such as light transmittance or sometimes make handling inconvenient. If the thickness is less than 1 μm, bond strength is not ensured occasionally.

A difference between the refractive index of the retardation film and the refractive index of the adhesive for bonding the retardation films is preferably not more than 0.20, more preferably not more than 0.15, particularly preferably not more than 0.10, most preferably not more than 0.05, and a difference between the refractive index of the retardation film and the refractive index of the adhesive for bonding the glass substrate is preferably not more than 0.20, more preferably not more than 0.15, particularly preferably not more than 0.10, most preferably not more than 0.05. A difference between the refractive index of the retardation film and the refractive index of the glass substrate is preferably not more than 0.20, more preferably not more than 0.15, particularly preferably not more than 0.10, most preferably not more than 0.05. By setting a difference in the refractive index in the above range, loss due to reflection of the transmitted light can be held down to a minimum, so that such a difference is desirable.

As a matter of course, in-plane aberration (transmission wavefront aberration) of the second wave plate of the invention is preferably as small as possible, and it is usually within 50 (mλ), preferably within 30 (m %), more preferably within 20 (mλ). By setting the in-plane aberration in the above range, an excellent S/N ratio or a permissible jitter range is obtained, so that such an in-place aberration is preferable. The symbol λ denotes a wavelength of a transmitted light, and a wavelength of a laser beam is generally employed.

The number of foreign particles in the second wave plate of the invention is preferably as small as possible, and the number of foreign particles having a particle diameter of not less than 10 μm is usually not more than 10 (particles/mm$^2$), preferably not more than 5 (particles/mm$^2$), more preferably not more than 1 (particle/mm$^2$). If more than 10 (particles/mm$^2$) of the foreign particles having a particle diameter of not less than 10 μm are present, noise signals are increased and a S/N ratio is lowered, so that such a number is undesirable. The foreign particles in the wave plate include particles that lower transmission of a laser beam and particles the presence of which greatly changes the advance direction of a laser beam. Examples of the former particles include dust, dirt, burnt resin, metallic powder and powders of minerals. Examples of the latter particles include contaminants of other resins and transparent substances having different refractive index.

The second wave plate of the invention may be a wave plate having been colored with a known colorant or the like in order to cut or lower transmission of a light having a wavelength other than the desired wavelength in case of need such as reduction of noises.

The second wave plate of the invention can be produced in the same manner as in a hitherto known process except that the retardation films, and the retardation film and the glass plate are lamination-fixed using different adhesives which are selected from the adhesives (A) and (B).

The second wave plate of the invention is a wave plate comprising at least two retardation films which are laminated on each other, on at least one surface of the laminated retardation films a glass substrate being laminated, wherein the retardation films, and the retardation film and the glass substrate are lamination-fixed respectively with different adhesives which are selected from the adhesives (A) and (B), and therefore, the initial properties can be maintained over a long period of time. As the retardation film, a film obtained by stretch-orientating a cycloolefin resin film is particularly preferable. By the use of such a wave plate of the invention, an optical information recording/reproducing device or a liquid crystal projector device capable of maintaining excellent performance over a long period of time and having high durability can be produced.

EXAMPLES

The present invention is further described with reference to the following examples, but it should be construed that the invention is in no way limited to those examples. The terms "part(s)" and "%" in the examples mean "part(s) by weight" and "% by weight", respectively, unless otherwise noted. Various tests and measurements in the examples are as follows.

Intrinsic Viscosity ($[\eta]_{inh}$)

Intrinsic viscosity was measured by an Ubbellohde viscometer using chloroform or cyclohexane as a solvent under the conditions of a polymer concentration of 0.5 g/dl and a temperature of 30° C.

Gel Content

In chloroform, 50 g of a hydrogenated (co)polymer was dissolved at a temperature of 25° C. so that the concentration should become 1%, and the resulting solution was filtered through a membrane filter having a pore diameter of 0.5 μm (available from Advantec Toyo Kaisha, Ltd.), a weight of said filter having been measured in advance. After the filtration, the filter was dried, and from an increase in weight, a gel content was calculated.

Degree of Hydrogenation

In case of a hydrogenated homopolymer, $^1$H-NMR at 500 MHz was measured, and from a ratio of absorption intensity between methyl hydrogen and olefin hydrogen of an ester group or a ratio of absorption intensity between paraffin hydrogen and olefin hydrogen, degree of hydrogenation was measured. In case of a hydrogenated copolymer, $^1$H-NMR absorption of a copolymer obtained after polymerization and that of a hydrogenated copolymer obtained after hydrogenation were compared to calculate degree of hydrogenation.

Glass Transition Temperature of Resin

Glass transition temperature was measured by a differential scanning calorimeter (DSC) in a nitrogen atmosphere at a heating rate of 10°/min.

Film Thickness

Film thickness was measured by a laser focus displacement gauge LT-8010 (manufactured by Keyence Corporation).

In-Plane Aberration

Transmission wavefront aberration was measured by a small-aperture laser interferometer (manufactured by Fuji Photo Optical Co., Ltd.) in a region of 5 mm diameter using a laser beam having a wavelength of 650 nm.

Phase Difference Value

Phase difference values at wavelengths of 480 nm, 550 nm, 590 nm, 630 nm and 750 nm were measured by KOBRA-21ADH (manufactured by Oji scientific Instruments), and phase difference values at other wavelengths than the above wavelengths were calculated from a Caucy's dispersion formula using the measured values at the above wavelengths.

High-Temperature High-Humidity Test

An environmental tester (manufactured by Espec Corp.) was set at 95° C. and 95% RH. A sample was placed in a chamber of the tester for 1,000 hours, then taken out of the chamber and subjected to visual observation, measurement of phase difference value and measurement of in-plane aberration.

Glass Transition Temperature (tan δ Peak Temperature) of Adhesive

A test strip (5 mm×7 cm) of an adhesive was prepared, and a glass transition temperature of the test strip was measured by Orientec Rheovibron (model DDV-01FP) at a frequency of 1 Hz in the temperature range of −100 to 150° C. When two or more peaks were present, a value on the higher temperature side was taken as a peak temperature (glass transition temperature).

With respect to an adhesive having a glass transition temperature of not higher than room temperature, a substrate (ARTON available from JSR Corporation, thickness: 10 μm), a tan δ peak temperature of which had been confirmed in advance, was coated with the adhesive in a thickness of 1 mm and then subjected to the peak temperature measurement, whereby a tan δ peak temperature derived from the adhesive was confirmed.

Young's Modulus of Adhesive

A No. 3 dumbbell of an adhesive was prepared, and a Young's modulus of the dumbbell was measured at 23° C. in accordance with JIS Z1702 by means of a tensile tester (manufactured by Instron Corporation). The pulling rate was adjusted to 10 mm/min.

With respect to an adhesive having a glass transition temperature of not higher than room temperature, a PET substrate having been coated with the adhesive in advance was formed into a No. 3 dumbbell. Immediately before the measurement, the PET substrate was removed to expose the adhesive, and a tensile test was carried out.

Synthesis Example 1

In a reaction vessel purged with nitrogen, 250 parts of 8-methyl-8-methoxycarbonyltetracyclo[$4.4.0.1^{2,5}.1^{7,10}$]-3-dodecene (specific monomer), 18 parts of 1 hexene (molecular weight modifier) and 750 parts of toluene (ring-opening polymerization reaction solvent) were placed, and this solution was heated to 60° C. Subsequently, to the solution in the reaction vessel, 0.62 part of a toluene solution of triethylaluminum (1.5 mol/l) as a polymerization catalyst and 3.7 parts of a toluene solution (concentration: 0.05 mol/l) of tungsten hexachloride modified with t-butanol and methanol (t-butanol:methanol:tungsten=0.35 mol:0.3 mol:1 mol) were added, and the system was heated and stirred at 80° C. for 3 hours to perform ring-opening polymerization reaction, whereby a ring-opened polymer solution was obtained. A polymerization conversion in the polymerization reaction was 97%, and the resulting ring-opened polymer had an intrinsic viscosity ($\eta_{inh}$), as measured in chloroform at 30° C., of 0.75 dl/g.

In an autoclave, 4,000 parts of the ring-opened polymer solution obtained above was placed, and to the ring-opened polymer solution, 0.48 part of RuHCl(CO)[P($C_6H_5$)$_3$]$_3$ was added, and they were heated and stirred for 3 hours under the conditions of a hydrogen gas pressure of 100 kg/cm$^2$ and a reaction temperature of 165° C. to perform hydrogenation reaction.

After the reaction solution (hydrogenated polymer solution) obtained above was cooled, the hydrogen gas pressure was released. The reaction solution was poured into a large amount of methanol to separate and recover solids. The solids were dried to obtain a hydrogenated polymer (referred to as a "resin A" hereinafter).

Measurement of degree of hydrogenation of the resulting resin A using $^1$H-NMR resulted in 99.9%. Measurement of a glass transition temperature (Tg) of the resin by a DSC method resulted in 165° C. Measurements of a number-average molecular weight (Mn) and a weight-average molecular weight (Mw) of the resin in terms of polystyrene by a GPC method (solvent: tetrahydrofuran) resulted in 32,000 (Mn) and 137,000 (Mw), and the molecular weight distribution (Mw/Mn) was 4.19. Measurement of water saturation-absorption of the resin at 23° C. resulted in 0.3%. Measurement of a SP value of the resin resulted in 19 (MPa$^{1/2}$). Measurement of an intrinsic viscosity ($\eta_{inh}$) of the resin in chloroform at 30° C. resulted in 0.78 dl/g. The gel content was 0.4%.

Synthesis Example 2

A hydrogenated polymer was obtained in the same manner as in Synthesis Example 1, except that 215 parts of 8-methyl-8-methoxycarbonyltetracyclo[$4.4.0.1^{2,5}.1^{7,10}$]-3-dodecene and 35 parts of bicyclo[2.2.1]hept-2-ene were used as specific monomers and the amount of 1-hexene (molecular weight modifier) was changed to 18 parts. The degree of hydrogenation of the resulting hydrogenated polymer (referred to as a "resin B" hereinafter) was 99.9%. Measurement of a glass transition temperature (Tg) of the resin by a DSC method resulted in 125° C. Measurements of a number-average molecular weight (Mn) and a weight-average molecular weight (Mw) of the resin in terms of polystyrene by a GPC method (solvent: tetrahydrofuran) resulted in 46,000 (Mn) and 190,000 (Mw), and the molecular weight distribution (Mw/Mn) was 4.15. Measurement of water saturation-absorption of the resin at 23° C. resulted in 0.18%. Measurement of a SP value of the resin resulted in 19 (MPa$^{1/2}$). Measurement of an intrinsic viscosity ($\eta_{inh}$) of the resin in chloroform at 30° C. resulted in 0.69 dl/g. The gel content was 0.2%.

Synthesis Example 3

A hydrogenated polymer was obtained in the same manner as in Synthesis Example 1, except that 225 parts of 8-ethylidenetetracyclo[$4.4.0.1^{2,5}.1^{7,10}$]-3-dodecene were used as a specific monomer, the amount of 1-hexene (molecular weight modifier) was changed to 30 parts, and cyclohexane was used as a ring-opening polymerization reaction solvent instead of toluene. The degree of hydrogenation of the resulting hydrogenated polymer (referred to as a "resin C" hereinafter) was 99.9%.

Measurement of a glass transition temperature (Tg) of the resin by a DSC method resulted in 138° C. Measurements of a number-average molecular weight (Mn) and a weight-average molecular weight (Mw) of the resin in terms of polystyrene by a GPC method (solvent: cyclohexane) resulted in 50,000 (Mn) and 190,000 (Mw), and the molecular weight distribution (Mw/Mn) was 3.80. Measurement of water saturation-absorption of the resin at 23° C. resulted in 0.01%. Measurement of a SP value of the resin resulted in 17 (MPa$^{1/2}$). Measurement of an intrinsic viscosity ($\eta_{inh}$) of the resin in cyclohexane at 30° C. resulted in 0.72 dl/g. The gel content was 0.4%.

Film Preparation Example 1

The resin A was dissolved in toluene so that the concentration should become 30% (solution viscosity at room temperature: 30,000 Pa·S). Then, a PET film (available from Toray Industries, Inc., Lumiler U94) having a thickness of 100 μm, which had been subjected to surface treatment for imparting hydrophilicity (facilitating adhesion) with an acrylic acid-based agent, was coated with the solution by means of an INVEX lab coater (manufactured by Inoue Kinzoku Kogyo Co., Ltd.) in such a manner that the film thickness on dry basis became 100 μm, and the coating film was subjected to primary drying at 50° C. and then secondary drying at 90° C. The dried film was peeled from the PET film to obtain a resin film A. The amount of a residual solvent in the resulting film was 0.5%.

Then, a photoelasticity coefficient ($C_P$) and a stress optical coefficient ($C_R$) of the film were determined in the following manner. Regarding the photoelasticity coefficient ($C_P$), several kinds of loads were applied to a strip of a film sample at room temperature (25° C.), and from a phase difference produced and a stress received by the sample, the photoelasticity coefficient was calculated. Regarding the stress optical coefficient ($C_R$), several kinds of loads were applied to a strip of a film sample at a temperature of not lower than Tg to stretch the sample, and the sample stretched by several % was slowly cooled to room temperature. From a phase difference produced after the cooling and a stress received by the sample, the stress optical coefficient was calculated. As a result, $C_P$ was 4 ($\times 10^{-12}$ Pa$^{-1}$), and $C_R$ was 1,750 ($\times 10^{-12}$ Pa$^{-1}$).

Property values of the resin film A are set forth in Table 1.

Film Preparation Example 2

A resin film B was prepared in the same manner as in Film Preparation Example 1, except that the resin B was used. The amount of a residual solvent in the resulting film B was 0.5%. The photoelasticity coefficient ($C_P$) and the stress optical coefficient ($C_R$) of the film were 9 ($\times 10^{-12}$ Pa$^{-1}$) and 2,350 ($\times 10^{-12}$ Pa$^{-1}$), respectively.

Property values of the resin film B are set forth in Table 1.

Film Preparation Example 3

A resin film C was prepared in the same manner as in Film Preparation Example 1, except that the resin C was used and cyclohexane was used as a solvent. The amount of a residual solvent in the resulting film C was 0.4%. The photoelasticity coefficient ($C_P$) and the stress optical coefficient ($C_R$) of the film were 4 ($\times 10^{-12}$ Pa$^{-1}$) and 1,950 ($\times 10^{-12}$ Pa$^{-1}$), respectively.

Property values of the resin film C are set forth in Table 1.

to 175° C., i.e., a temperature of Tg+10° C., monoaxially stretched at a stretching rate of 400%/min in a stretch ratio of 2.1 times, then held in this state for 1 minute in an atmosphere of 110° C., thereafter cooled to room temperature and taken out, whereby a retardation film A-2 having a thickness of 81 μm and giving a phase difference of 330 nm at a wavelength of 655 nm could be obtained. The surface roughness (Rmax) of each of the films was confirmed, and as a result, it was 0.1 μm.

Thus, a retardation film A-1 and a retardation film A-2 were obtained. The surface roughness (Rmax) of each of these films was confirmed, and as a result, it was 0.1 μm.

The retardation films A-1 and A-2 were each cut into a circle having a diameter of 10 mm, and they were laminated on each other with an acrylic adhesive (8142, available from Sumitomo 3M Ltd., Japan) of 10 μm thickness in an overlap width of 1 mm in the circumferential area in such a manner that the angle made by the optical axes of the retardation films became 60°. In this laminating operation, the adhesive was not applied in a width of about 1 mm in the overlap width area to form an air vent. Thus, a wave plate A was obtained. The wave plate A is shown in FIG. 1.

It was confirmed by a polarization microscope that the number of foreign particles having a particle diameter of not less than 10 μm in the wave plate A was not more than 10 particles/mm$^2$. As a result of confirmation of in-plane aberration of the wave plate A, it was 18 mλ. Further, the wave plate A was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 2

A retardation film B-1 having a thickness of 89 μm and giving a phase difference of 275 nm at a wavelength of 655 nm was obtained in the same manner as in Example 1, except that the resin film B was used and the stretching conditions were changed to a stretch ratio of 1.3 times and a heating temperature of 130° C. The surface roughness (Rmax) of the film was confirmed, and as a result, it was 0.1 μm.

Two of the retardation films B-1 were prepared, then they were each cut into a circle having a diameter of 10 mm, and

TABLE 1

| | Tg (° C.) | $C_P, C_R$ ($\times 10^{-12}$ Pa$^{-1}$) | Thickness (μm) | Amount of residual solvent (%) | Total light transmittance (%) | Phase difference at 590 nm (nm) |
|---|---|---|---|---|---|---|
| Resin film A | 165 | 4, 1,750 | 100 | 0.5 | 93 | 6.8 |
| Resin film B | 125 | 9, 2,350 | 100 | 0.5 | 93 | 6.8 |
| Resin film C | 138 | 4, 1,950 | 100 | 0.4 | 93 | 5.2 |

Example 1

Figure 2:
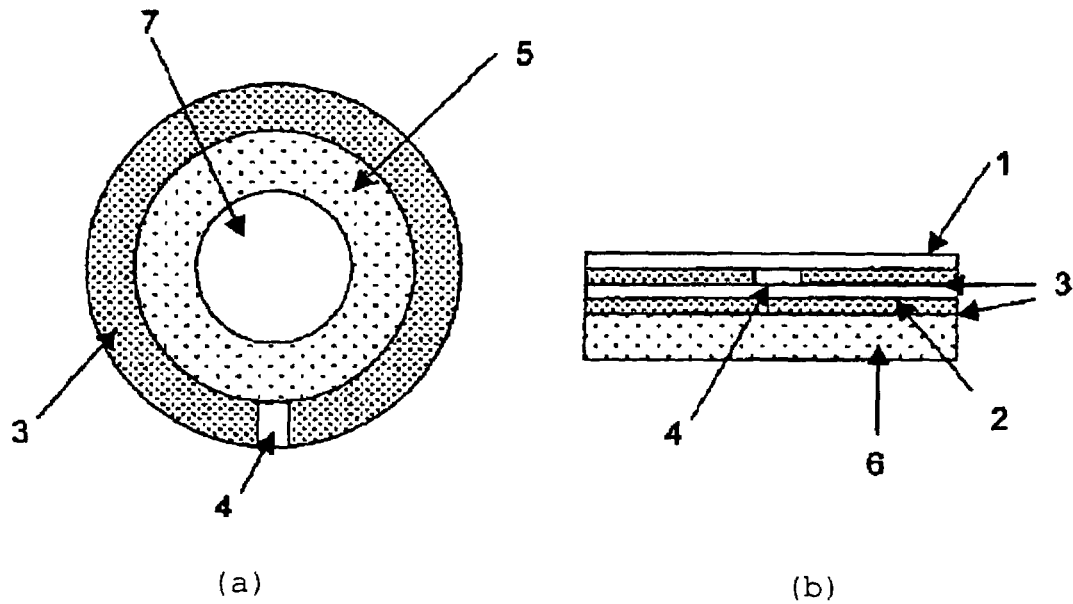
FIG. 2 is a group of constitutional views of a wave plate prepared in Example 2.

In a tenter, the resin film A was heated to 175° C., i.e., a temperature of Tg+10° C., monoaxially stretched at a stretching rate of 400%/min in a stretch ratio of 1.4 times, then held in this state for 1 minute in an atmosphere of 110° C., thereafter cooled to room temperature and taken out, whereby a retardation film A-1 having a thickness of 89 μm and giving a phase difference of 160 nm at a wavelength of 655 nm could be obtained. Separately, in a tenter, the resin film A was heated they were laminated on each other with an acrylic adhesive (8142, available from Sumitomo 3M Ltd., Japan) of 10 μm thickness in an overlap width of 1 mm in the circumferential area in such a manner that the angle made by the optical axes of the retardation films became 45°. In this laminating operation, the adhesive was not applied in a width of about 1 mm in the overlap width area to form an air vent. On one surface of the laminated retardation films, a substrate of 1 mm thickness in the form of a doughnut disc obtained by injection molding of the resin A was laminated using an acrylic adhesive (8142, available from Sumitomo 3M Ltd., Japan) to obtain a wave plate B. The wave plate B is shown in FIG. 2.

It was confirmed by a polarization microscope that the number of foreign particles having a particle diameter of not less than 10 μm in the wave plate B was not more than 10 particles/mm². As a result of confirmation of in-plane aberration of the wave plate B, it was 12 mλ. Further, the wave plate B was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 3

A retardation film C-1 having a thickness of 96 μm and giving a phase difference of 125 nm at a wavelength of 655 nm was obtained in the same manner as in Example 1, except that the resin film C was used and the stretching conditions were changed to a stretch ratio of 1.08 times and a heating temperature of 148° C. Further, a retardation film C-2 having a thickness of 91 μm and giving a phase difference of 250 nm at a wavelength of 655 nm was obtained in the same manner as in Example 1, except that the resin film C was used and the stretching conditions were changed to a stretch ratio of 1.18 times and a heating temperature of 148° C. The surface roughness (Rmax) of each of the films was confirmed, and as a result, it was 0.1 μm.

Then, a wave plate C was obtained in the same manner as in Example 1, except that the retardation films C-1 and C-2 were laminated on each other in such a manner that the angle made by the optical axes of the retardation films became 55°.

It was confirmed by a polarization microscope that the number of foreign particles having a particle diameter of not less than 10 μm in the wave plate C was not more than 10 particles/mm². As a result of confirmation of in-plane aberration of the wave plate C, it was 16 mλ. Further, the wave plate C was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Comparative Example 1

A wave plate D was obtained in the same manner as in Example 1, except that an adhesive layer having a thickness of 10 μm was provided on the whole surface of the film to bond the films on each other.

It was confirmed by a polarization microscope that the number of foreign particles having a particle diameter of not less than 10 μm in the wave plate D was not more than 10 particles/mm². As a result of confirmation of in-plane aberration of the wave plate D, it was 24 mλ. Further, the wave plate D was subjected to a high-temperature high-humidity test. As a result, a change of the phase difference value was not more than 3%, and no change of appearance was observed. However, a change of the in-plane aberration was 18 mλ, and it has become obvious that there is a possibility of occurrence of a problem in properties of the wave plate.

Example 4

Retardation A-1 and A-2 were obtained in the same manner as in Example 1.

The retardation A-1 and A-2 were laminated on each other with an acrylic adhesive (8142, available from Sumitomo 3M Ltd., Japan) of 10 μm thickness in such a manner that the angle made by the optical axes of the retardation films became 60°. Further, on both surfaces of the laminated films, glass plates each having a thickness of 250 μm were laminated using an acrylic adhesive (XVL-90, available from Kyoritsu Chemical & Co., Ltd.) of 10 μm thickness to obtain a wave plate E. The adhesive 8142 (available from Sumitomo 3M Ltd., Japan) used as the adhesive (A) had a tan δ peak temperature of −63° C. and a Young's modulus of 0.6 MPa, and the adhesive XVL-90 (available from Kyoritsu Chemical & Co., Ltd.) used as the adhesive (B) had a tan δ peak temperature of 61° C. and a Young's modulus of 75 MPa.

Measurement of phase difference of the wave plate E was carried out, and as a result, a phase difference at 655 nm was 161 nm, and a phase difference at 785 nm was 195 nm. Therefore, the wave plate E proved to function as a "¼ wave plate" in a wide band.

It was confirmed by a polarization microscope that the number of foreign particles having a particle diameter of not less than 10 μm in the wave plate E was not more than 10 particles/mm².

As a result of confirmation of in-plane aberration of the wave plate E, it was 18 mλ.

Further, the wave plate E was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 5

A retardation film B-1 was obtained in the same manner as in Example 2.

Two of the retardation films B-1 were prepared, and they were laminated on each other with an acrylic adhesive (8142, available from Sumitomo 3M Ltd., Japan) of 10 μm thickness in such a manner that the angle made by the optical axes of the retardation films became 45°. Further, on both surfaces of the laminated films, glass plates each having a thickness of 250 μm were laminated using an acrylic adhesive (XVL-90, available from Kyoritsu Chemical & Co., Ltd.) of 10 μm thickness to obtain a wave plate F.

Measurement of phase difference of the wave plate F was carried out, and as a result, a phase difference at 500 nm was 246 nm, and a phase difference at 785 nm was 395 nm. Therefore, the wave plate F proved to function as a "½ wave plate" in a wide band.

It was confirmed by a polarization microscope that the number of foreign particles having a particle diameter of not less than 10 μm in the wave plate F was not more than 10 particles/mm².

As a result of confirmation of in-plane aberration of the wave plate F, it was 15 mλ.

Further, the wave plate F was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 6

Retardation films C-1 and C-2 were obtained in the same manner as in Example 3.

The retardation films C-1 and C-2 were laminated on each other with an acrylic adhesive (8142, available from Sumitomo 3M Ltd., Japan) of 10 μm thickness in such a manner that the angle made by the optical axes of the retardation films became 55°. Further, on both surfaces of the laminated films, glass plates each having a thickness of 250 μm were laminated using an acrylic adhesive (XVL-90, available from Kyoritsu Chemical & Co., Ltd.) of 10 μm thickness to obtain a wave plate G.

Measurement of phase difference of the wave plate G was carried out, and as a result, a phase difference at 405 nm was 102 nm, and a phase difference at 655 nm was 165 nm. Therefore, the wave plate G proved to function as a "¼ wave plate" in a wide band.

It was confirmed by a polarization microscope that the number of foreign particles having a particle diameter of not less than 10 μm in the wave plate G was not more than 10 particles/mm$^2$.

As a result of confirmation of in-plane aberration of the wave plate G, it was 35 mλ.

Further, the wave plate G was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 7

Two of the retardation films C-2 were laminated on each other with an acrylic adhesive (XVL-90, available from Kyoritsu Chemical & Co., Ltd.) of 10 μm thickness in such a manner that the angle made by the optical axes of the retardation films became 40°. Further, on one surface of the laminated films, a glass plate having a thickness of 250 μm was laminated using an acrylic adhesive (8142, available from Sumitomo 3M Ltd., Japan) of 20 μm thickness to obtain a wave plate H.

Measurement of phase difference of the wave plate H was carried out, and as a result, a phase difference at 405 nm was 199 nm, and a phase difference at 655 nm was 325 nm. Therefore, the wave plate H proved to function as a "½ wave plate" in a wide band.

It was confirmed by a polarization microscope that the number of foreign particles having a particle diameter of not less than 10 μm in the wave plate H was not more than 10 particles/mm$^2$.

As a result of confirmation of in-plane aberration of the wave plate H, it was 17 mλ.

Further, the wave plate H was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 8

A retardation film B-2 having a thickness of 70 μm and giving a phase difference of 710 nm at a wavelength of 655 nm was obtained in the same manner as in Example 1, except that the resin film B was used and the stretching conditions were changed to a stretch ratio of 1.92 times and a heating temperature of 148° C. Further, a retardation film A-3 having a thickness of 90 μm and giving a phase difference of 175 nm at a wavelength of 655 nm was obtained in the same manner as in Example 1, except that the resin film A was used and the stretching conditions were changed to a stretch ratio of 1.42 times. The retardation films B-2 and A-3 were laminated on each other with an acrylic adhesive (XVL-90, available from Kyoritsu Chemical & Co., Ltd.) of 10 μm thickness in such a manner that the angle made by the optical axes of the retardation films became 50°. Further, on one surface of the laminated films, a glass plate having a thickness of 250 μm was laminated using an acrylic adhesive (8142, available from Sumitomo 3M Ltd., Japan) of 20 μm thickness to obtain a wave plate I.

Measurement of phase difference of the wave plate I was carried out, and as a result, a phase difference at 655 nm was 164 nm, and a phase difference at 785 nm was 196 nm. Therefore, the wave plate I proved to function as a "¼ wave plate" in a wide band.

It was confirmed by a polarization microscope that the number of foreign particles having a particle diameter of not less than 10 μm in the wave plate I was not more than 10 particles/mm$^2$.

As a result of confirmation of in-plane aberration of the wave plate I, it was 32 mλ.

Further, the wave plate I was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 9

A retardation film B-3 having a thickness of 87 μm and giving a phase difference of 355 nm at a wavelength of 655 nm was obtained in the same manner as in Example 1, except that the resin film B was used and the stretching conditions were changed to a stretch ratio of 1.58 times and a heating temperature of 148° C.

The retardation films B-2 and B-3 were laminated on each other with an acrylic adhesive (XVL-90, available from Kyoritsu Chemical & Co., Ltd.) of 10 μm thickness in such a manner that the angle made by the optical axes of the retardation films became 60°. Further, on one surface of the laminated films, a glass plate having a thickness of 250 μm was laminated using an acrylic adhesive (8142, available from Sumitomo 3M Ltd., Japan) of 20 μm thickness to obtain a wave plate J.

Measurement of phase difference of the wave plate J was carried out, and as a result, a phase difference at 655 nm was 320 nm, and a phase difference at 785 nm was 395 nm. Therefore, the wave plate I proved to function as a "½ wave plate" in a wide band.

It was confirmed by a polarization microscope that the number of foreign particles having a particle diameter of not less than 10 μm in the wave plate J was not more than 10 particles/mm$^2$.

As a result of confirmation of in-plane aberration of the wave plate J, it was 32 mλ.

Further, the wave plate J was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 10

The retardation films A-1 and A-2 were laminated on each other with an acrylic adhesive (XVL-90, available from Kyoritsu Chemical & Co., Ltd.) of 10 μm thickness in such a manner that the angle made by the optical axes of the retardation films became 60°. Further, on both surfaces of the laminated films, glass plates each having a thickness of 250

μm were laminated using an acrylic adhesive (8142, available from Sumitomo 3M Ltd., Japan) of 20 μm thickness to obtain a wave plate K.

Measurement of phase difference of the wave plate K was carried out, and as a result, a phase difference at 655 nm was 162 nm, and a phase difference at 785 nm was 195 nm. Therefore, the wave plate K proved to function as a "¼ wave plate" in a wide band.

It was confirmed by a polarization microscope that the number of foreign particles having a particle diameter of not less than 10 μm in the wave plate K was not more than 10 particles/mm$^2$.

As a result of confirmation of in-plane aberration of the wave plate K, it was 31 mλ.

Further, the wave plate K was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Example 11

Two of the retardation films C-2 were laminated on each other with an acrylic adhesive (8142, available from Sumitomo 3M Ltd., Japan) of 10 μm thickness in such a manner that the angle made by the optical axes of the retardation films became 40°. Further, on one surface of the laminated films, a glass plate having a thickness of 250 μm was laminated using an acrylic adhesive (XVL-90, available from Kyoritsu Chemical & Co., Ltd.) of 10 μm thickness to obtain a wave plate L.

Measurement of phase difference of the wave plate L was carried out, and as a result, a phase difference at 405 nm was 201 nm, and a phase difference at 655 nm was 326 nm. Therefore, the wave plate L proved to function as a "½ wave plate" in a wide band.

It was confirmed by a polarization microscope that the number of foreign particles having a particle diameter of not less than 10 μm in the wave plate L was not more than 10 particles/mm$^2$.

As a result of confirmation of in-plane aberration of the wave plate L, it was 31 mλ.

Further, the wave plate L was subjected to a high-temperature high-humidity test. As a result, it was confirmed that a change of the phase difference value was not more than 3%, a change of the in-plane aberration was not more than 5 mλ, no change of appearance was observed, and excellent properties were maintained.

Comparative Example 2

The retardation films A-1 and A-2 were laminated on each other with an acrylic adhesive (XVL-90, available from Kyoritsu Chemical & Co., Ltd.) of 10 μm thickness in such a manner that the angle made by the optical axes of the retardation films became 60°. Further, on both surfaces of the laminated films, glass plates each having a thickness of 250 μm were laminated using an acrylic adhesive (XVL-90, available from Kyoritsu Chemical & Co., Ltd.) of 10 μm thickness to obtain a wave plate M.

Measurement of phase difference of the wave plate M was carried out, and as a result, a phase difference at 655 nm was 160 nm, and a phase difference at 785 nm was 196 nm. Therefore, the wave plate M proved to function as a "¼ wave plate" in a wide band.

It was confirmed by a polarization microscope that the number of foreign particles having a particle diameter of not less than 10 μm in the wave plate M was not more than 10 particles/mm$^2$.

As a result of confirmation of in-plane aberration of the wave plate M, it was 20 mλ.

Further, the wave plate M was subjected to a high-temperature high-humidity test. As a result, it was confirmed that a change of the phase difference value was not more than 3% and no change of appearance was observed, but a change of the in-plane aberration was 10 mλ.

Comparative Example 3

Two of the retardation films B-2 were laminated on each other with an acrylic adhesive (8142, available from Sumitomo 3M Ltd., Japan) of 10 μm thickness in such a manner that the angle made by the optical axes of the retardation films became 45°. Further, on both surfaces of the laminated films, glass plates each having a thickness of 250 μm were laminated using an acrylic adhesive (8142, available from Sumitomo 3M Ltd., Japan) of 10 μm thickness to obtain a wave plate N.

Measurement of phase difference of the wave plate N was carried out, and as a result, a phase difference at 655 nm was 328 nm, and a phase difference at 785 nm was 390 nm. Therefore, the wave plate N proved to function as a "½ wave plate" in a wide band.

It was confirmed by a polarization microscope that the number of foreign particles having a particle diameter of not less than 10 μm in the wave plate N was not more than 10 particles/mm$^2$.

As a result of confirmation of in-plane aberration of the wave plate N, it was 18 mλ.

Further, the wave plate N was subjected to a high-temperature high-humidity test. As a result, it was confirmed that a change of the phase difference value was not more than 3% and no change of appearance was observed, but a change of the in-plane aberration was 15 mλ.

Comparative Example 4

The retardation films C-1 and C-2 were laminated on each other with an acrylic adhesive (XVL-90, available from Kyoritsu Chemical & Co., Ltd.) of 10 μm thickness in such a manner that the angle made by the optical axes of the retardation films became 55°. Further, on both surfaces of the laminated films, glass plates each having a thickness of 250 μm were laminated using an acrylic adhesive (XVL-90, available from Kyoritsu Chemical & Co., Ltd.) of 10 μm thickness to obtain a wave plate O.

It was confirmed by a polarization microscope that the number of foreign particles having a particle diameter of not less than 10 μm in the wave plate O was not more than 10 particles/mm$^2$.

As a result of confirmation of in-plane aberration of the wave plate O, it was 40 mλ.

Further, the wave plate O was subjected to a high-temperature high-humidity test. As a result, it was confirmed that a change of the phase difference value was not more than 3% and no change of appearance was observed, but a change of the in-plane aberration was 15 mλ.

Comparative Example 5

Two of the retardation films C-2 were laminated on each other with an acrylic adhesive (XVL-90, available from Kyoritsu Chemical & Co., Ltd.) of 10 μm thickness in such a manner that the angle made by the optical axes of the retardation films became 40°. Further, on one surface of the laminated films, a glass plate having a thickness of 250 μm was laminated using an acrylic adhesive (XVL-90, available from Kyoritsu Chemical & Co., Ltd.) of 10 μm thickness to obtain a wave plate P.

Measurement of phase difference of the wave plate P was carried out, and as a result, a phase difference at 405 nm was 200 nm, and a phase difference at 655 nm was 323 nm. Therefore, the wave plate P proved to function as a "½ wave plate" in a wide band.

It was confirmed by a polarization microscope that the number of foreign particles having a particle diameter of not less than 10 μm in the wave plate P was not more than 10 particles/mm$^2$.

As a result of confirmation of in-plane aberration of the wave plate P, it was 24 mλ.

Further, the wave plate P was subjected to a high-temperature high-humidity test. As a result, it was confirmed that a change of the phase difference value was not more than 3% and no change of appearance was observed, but a change of the in-plane aberration was 18 mλ.

Comparative Example 6

The retardation films B-2 and A-3 were laminated on each other with an acrylic adhesive (8142, available from Sumitomo 3M Ltd., Japan) of 10 μm thickness in such a manner that the angle made by the optical axes of the retardation films became 50°. Further, on one surface of the laminated films, a glass plate having a thickness of 250 μm was laminated using an acrylic adhesive (8142, available from Sumitomo 3M Ltd., Japan) of 10 μm thickness to obtain a wave plate Q.

Measurement of phase difference of the wave plate Q was carried out, and as a result, a phase difference at 655 nm was 162 nm, and a phase difference at 785 nm was 198 nm. Therefore, the wave plate Q proved to function as a "¼ wave plate" in a wide band.

It was confirmed by a polarization microscope that the number of foreign particles having a particle diameter of not less than 10 μm in the wave plate Q was not more than 10 particles/mm$^2$.

As a result of confirmation of in-plane aberration of the wave plate N, it was 20 mλ.

Further, the wave plate Q was subjected to a high-temperature high-humidity test. As a result, it was confirmed that a change of the phase difference value was not more than 3% and no change of appearance was observed, but a change of the in-plane aberration was 16 mλ.

INDUSTRIAL APPLICABILITY

With respect to recording of sounds or images, optical information recording/reproducing devices using the first and the second wave plates of the invention can be applied to any of reproduction only recording media, write once read many recording media and rewritable recording media, and can be used in recording devices for CD-ROM, CD-R, rewritable DVD and the like, OA machines using them, sound reproducing devices for CD and the like, image reproducing devices for DVD and the like, AV machines using them, game machines using the above CD and DVD, etc. Further, the first and the second wave plates of the invention can be also used in liquid crystal projector devices.

The invention claimed is:

1. A wave plate comprising at least two retardation films, which are obtained by stretch-orientating cycloolefin resin films and which are laminated on each other,
    wherein on at least one surface of said laminated retardation films a glass substrate is laminated, and
    wherein the retardation films, and the retardation film and the glass substrate are lamination-fixed respectively with different adhesives which are selected from the following adhesives (A) and (B):
        an adhesive (A) having a glass transition temperature of not higher than 0° C. and a Young's modulus at 23° C. of not more than 10 MPa, and
        an adhesive (B) having a glass transition temperature of not lower than 40° C. and a Young's modulus at 23° C. of not less than 30 MPa,
        with the proviso that a difference in glass transition temperature between the adhesive (A) and the adhesive (B) is 60° C. or more and a difference in Young's modulus at 23° C. between the adhesive (A) and the adhesive (B) is 40 MPa or more.

2. The wave plate as claimed in claim 1, wherein on both surfaces of the laminated retardation films glass substrates are laminated, the retardation films are lamination-fixed to each other with the adhesive (A), and the retardation film and the glass substrate are fixed to each other with the adhesive (B).

3. A process for producing a wave plate, the process comprising
    laminating at least two retardation films on each other, where the retardation films are obtained by stretch-orientating cycloolefin resin films; and
    laminating a glass substrate on at least one surface of the laminated retardation films, wherein
    the retardation films, and the retardation film and the glass substrate are lamination-fixed respectively with different adhesives which are selected from the following adhesives (A) and (B):
        an adhesive (A) having a glass transition temperature of not higher than 0° C. and a Young's modulus at 23° C. of not more than 10 MPa, and
        an adhesive (B) having a glass transition temperature of not lower than 40° C. and a Young's modulus at 23° C. of not less than 30 MPa,
        with the proviso that a difference in glass transition temperature between the adhesive (A) and the adhesive (B) is 60° C. or more and a difference in Young's modulus at 23° C. between the adhesive (A) and the adhesive (B) is 40 MPa or more.

4. The wave plate as claimed in claim 1, wherein the cycloolefin resin films comprise cycloolefin resin having a glass transition temperature in a range of from 120 to 350° C.

5. The wave plate as claimed in claim 1, wherein each of the cycloolefin resin films has a linear expansion coefficient in a temperature range of 20 to 100° C. of not more than $1 \times 10^{-4}$ (1/° C.).

6. The wave plate as claimed in claim 1, wherein the glass substrate has a thickness in a range of from 0.01 to 5 mm.

7. The wave plate as claimed in claim 1, wherein the adhesive (A) is selected from the group consisting of natural rubber adhesives, synthetic rubber adhesives, vinyl acetate/ vinyl chloride copolymer adhesives, silicon adhesives, polyvinyl ether adhesives, acrylic adhesives, epoxy adhesives and urethane adhesives.

8. The wave plate as claimed in claim 1, wherein the adhesive (A) is an acrylic adhesive.

9. The wave plate as claimed in claim 1, wherein the adhesive (B) is selected from the group consisting of natural rubber adhesives, synthetic rubber adhesives, vinyl acetate/vinyl chloride copolymer adhesives, silicon adhesives, polyvinyl ether adhesives, acrylic adhesives, epoxy adhesives and urethane adhesives.

10. The wave plate as claimed in claim 1, wherein the adhesive (B) is an acrylic adhesive.

* * * * *